(12) United States Patent
Vavik

(10) Patent No.: US 7,885,634 B2
(45) Date of Patent: Feb. 8, 2011

(54) HIGH FREQUENCY SIGNAL HUB

(76) Inventor: Geir Monsen Vavik, N-7057 Devre Vikeraunet, Jonsvatnet (NO)

( * ) Notice: Subject to any disclaimer, the term of this patent is extended or adjusted under 35 U.S.C. 154(b) by 301 days.

(21) Appl. No.: 11/910,742

(22) PCT Filed: Apr. 11, 2006

(86) PCT No.: PCT/NO2006/000137

§ 371 (c)(1),
(2), (4) Date: Jun. 9, 2008

(87) PCT Pub. No.: WO2006/110047

PCT Pub. Date: Oct. 19, 2006

(65) Prior Publication Data

US 2009/0122842 A1    May 14, 2009

(30) Foreign Application Priority Data

Apr. 11, 2005   (NO) .................................. 20051782

(51) Int. Cl.
*H04M 9/00*      (2006.01)

(52) U.S. Cl. .................. 455/402; 455/14; 455/13.4; 455/15

(58) Field of Classification Search ................ 455/402, 455/426.2, 426.1, 14, 41.2, 67.11, 11.1, 336, 455/13.4, 15, 7; 375/211, 316; 342/51, 42, 342/57
See application file for complete search history.

(56) References Cited

U.S. PATENT DOCUMENTS

| | | | | |
|---|---|---|---|---|
| 5,257,006 A | * | 10/1993 | Graham et al. | 340/310.16 |
| 6,542,557 B2 | * | 4/2003 | Morriss et al. | 375/316 |
| 2003/0224784 A1 | * | 12/2003 | Hunt et al. | 455/426.2 |
| 2004/0110483 A1 | * | 6/2004 | Mollenkopf | 455/402 |

* cited by examiner

*Primary Examiner*—John Lee

(57) ABSTRACT

The present invention concerns a system for high frequency signal transmission in power line networks and also concerns signal hubs and repeaters to be used in such systems. The primary aim of the invention is to provide a communication system of a general type wherein the isolation between high frequency input and output signals is maintained. The hubs and repeaters are designed to be easily installed in the network. Radio and wireless links at subscriber nodes are also parts of the system.

43 Claims, 14 Drawing Sheets

HIGH FREQUENCY SIGNAL HUB

The present invention concerns analogue signal repeater system solutions of the general type as explained in the preamble of the appended claim 1, as well as analogue signal repeater as described in appended claims.

BACKGROUND

During the last 20 years analogue high frequency repeaters in digital communication systems have been neglected in favour of digital solutions. Analogue amplifiers may be realized with analogue or digital signal processing methods and are characterized by foremost being completely or partly transparent. They give an amplified, analog representation of the input signal which offers a near unchanged bandwidth and very low latency even with very large system bandwidths Digital repeaters are not transparent and are likely to be based on just on type of modulation and one type of communication protocol which again is likely to be of proprietary character. The resulting conversion taking place within them gives a high current draw and usually they exhibit large physical dimensions. In addition each repeater contributes to a substantial reduction of total bandwidth of the system and introduces always problematic latencies that either excludes or complicates certain modern, time critical digital telecommunication services.

There will also be physical limits for how far technologies using digital repeaters can be developed for large bandwidths. Using semiconductors of known kinds there are physical limitations for how much it is possible to reduce power consumption at high processing speeds which among other is given by the lower limit for the transistor supply voltage and clock frequencies. Adding to this is that such solutions are not inexpensive to manufacture from for instance the need to always being obliged to use the latest and most expensive technology. Such technologies are therefore rapidly superseded by new generations resulting in high write-off costs. As a consequence it is therefore expensive and impractical to use sufficient number of such repeaters as for example to sustain low signal levels on cables or cover an area by wireless where line of sight obstructions are eminent. There is therefore a significant need for innovative solutions that give repeaters that can be used in larger numbers showing low production costs and that exhibit small dimensions and consume small currents. An analog repeater system can additionally be made compatible with any existing none proprietary communication system and will be usable with most future ones.

Analog repeaters do not have the drawbacks mentioned with respect to digital repeaters. It has been claimed that the main disadvantage of analog repeaters is their accumulation of noise. This conclusion contains substantial errors, besides it is a fact that a system with digital repeaters will accumulate noise that gradually reduce the symbol bandwidth in addition to the reduction of bandwidth happening due to the time delays associated with each repeater. It is know from old time's analog repeaters of telephone systems that they accomplished relaying the signals around the globe. With regenerative, super regenerative and super heterodyne analog repeaters it is possible to obtain regeneration of the signal that among other reasons is due to the averaging of noise in the same way as when amplifiers are connected in parallel. The accumulated, systematic noise may be reduced by various means. A large number of analog repeaters can be utilized until a significant degeneration of the signal takes place provided the repeaters have measures accordingly construction wise. The advantage of analog repeaters is that they consume substantially less energy than the digital. This is particularly important when they are to be battery powered or are to live off currents in conductors which they are loosely connected to, for example inductively.

I repeater or transponder systems as given in patent documents NO2001057, NO20010132, NO20040112, PCT/NO01/00079, PCT/NO003/00004N NO20040110, PCT/NO20050013 is shown how analog repeaters and systems using analog repeaters can be realized in sub optimal cases for both wireless and wire bound solutions or integrations of such. Characteristics for such impaired cases are when conventional schemes are not applicable or when sufficient isolation between input signal and output signal is not inherently increasable to become larger than the gain of the repeater. Consequently it is also characteristic of such cases that there are points along the signal medium where analog gain is necessary but where it is impractical to introduce such isolation. Examples of this are cable junctions that cannot be broken such as with power grid wires and cables. One example in wireless applications is when only one antenna can be applied or when large separation in the form of number of wavelengths cannot be realized. Further examples of unfavourable cases are when the isolation between input and output signals are reduced due to reflections of various causes. This may be the case for both wire bound and wireless systems. In wire bound systems a certain control may usually be exercises accordingly. In wireless systems variable reflection conditions if often a greater problem. A one port amplifier, meaning a repeater is stable only as long as sufficient isolation between the amplifier or repeater and a reflection occurring in the system or repeater cascade is present. It is therefore a need of novel, simple solutions that makes it more practical to meet such challenges. In some cases conventional principles have utilized circulators to aid isolation and achieve directional sensitivity. However, this is costly and additionally impractical in large numbers. Even other types of directional sensitivity is often impractical to implement.

The results of lacking isolation between input and output signals with signal repetition using frequency transposing is duplex noise.

The consequences under the mentioned impaired conditions followed by improper isolation or reflections may be that stability criteria for same channel signal repetition cannot be met.

When frequency transposing is applied in analog repeater systems it is often important that a minimum of channels are utilized for duplex purposes both to achieve the largest possible effective symbol bandwidth using the available frequency spectrum as well as to allow space for channels for two way communication or multiple channel systems to accomplish an increased, available system bandwidth. In this context it is also required to place adjacent channels as close to each other as possible. Super regenerative frequency converts allow very small spacing between input and output channel in a repeater as depicted in the publications NO20011057, NO20010132, NO20020112, NO20040110, PCT/NO01/00079, PCT/NO03/00004, PCT/NO20050013. There is a need for novel applications that can make more efficient use of available and useful channels in such systems. This is especially important in broad band applications. It is also particularly important in wireless applications when the density in certain frequency bands is large. It may be even more important in cable based systems, in particular with cables exhibiting poor high frequency properties where often only marginal frequency regions are available for the symbol bandwidth in demand today and in the future.

When the signal gain is larger than 1 for a same frequency repeater the stability criteria are important in order to utilize the gain. Reflections and echoes from other repeaters play a substantial role in order to achieve stability. The phase is influenced by the complex impedance the gain port or ports look into and by the isolation between the ports of a multi port gain block. Analog gains has to a large extent been omitted in modern networks due to the difficulties of achieving the combination of stability with sufficient gain. It is particularly difficult to produce solutions that are repeatable and possibly reproducible I large numbers or in large systems. Directional attenuation in some form is often the only and the best measure against echoes and reflections. In some applications attenuation of interference of 10 to 20 dB is sufficient, however in other applications that demand good linearity as with QAM and OFDM attenuations of 30 to 50 dB is required. For some modulation types problems with frequency beating may occur even with relatively large isolation. Previously published solutions are not capable of satisfying isolation levels and those principles only have limited applications as for instance with none linear systems like frequency modulation using rather narrow bandwidths. It is therefore a large need for novel, practical solutions that offer repeater stability combined with satisfactory gain and signal to noise ratio. There is a need for such solutions both for signal repetition using frequency transposing as well as same frequency repetition.

There is a large need for improvement of connectivity and installation friendliness in broad band systems utilizing the power grid as infrastructure generally. This need also concerns such systems that incorporate analog repeater systems.

OBJECT OF THE INVENTION

An object of the invention is to realize novel, innovative solutions that achieve practically one hundred percent connectivity in systems for digital networks based on the infrastructures constituted by the power grids. Several of these objects may be common to corresponding, other infrastructures and wireless networks. Further it is an object of the invention to achieve installation convenience comparable to established technologies or better.

It is an object of the said invention to make available solutions that in cost effective and production friendly manner ensures repeatability, stable operation and maximum signal dynamics for analog high frequency repeaters in systems especially for one- and two way wire bound digital communication, digital streaming, digital multicast, digital return channel and for other systems such as digital terrestrial networks and similar systems however, not to exclude other, important applications in wireless transmissions. An object of the invention is also that power consumption is to be kept low through design simplicity. A further object of the invention is for it to be installation friendly. The object of the invention is also to provide redundancy, improved stability and widened application areas for the inventions described in NO20001057, NO20010132, NO20020112, PCT/NO01/00079, PCT/NO03/00004. Further objects of the invention are achieved through improving the stability criteria for same frequency repeaters both with gains less than isolation between ports as well as gains larger than the isolation between ports. A similar object of the invention is achieved with solutions concerning duplex conditions. Still more objects of the invention is achieved with solutions reducing mutual interference between repeaters, beating between repeaters and interference from echoes and reflections. Further one object of the invention is to enable the realisation of practical solutions for directional discrimination and transmission of large bandwidths on single conductors like high voltage power lines. One object of the invention is also to allow the solutions of said invention to be utilized in an adaptive way where adaptivity preferably is controlled by local intelligence or by central intelligence. One further object of the invention is to facilitate the combination of a number of methods to achieve isolation between ports, to reflections and to other repeaters.

For a skilled expert in the art other objects of the invention will be obvious from the descriptions of the invention.

THE INVENTION

The present invention can be described as a communication system to achieve nearly ideal connectivity with communication mediums or infrastructures where dispersion, cross talk, reflections and attenuation constitutes that this is not achievable or is hardly attained using standard equipment or methods for network communication.

The invention in this way offers a communication system achieving constant bandwidth nearly independently of range within communication medium or infrastructure where dispersion, cross talk, reflections and attenuation.

The invention therefore is especially suited for power networks where all these problems exist and where the infrastructure basically is unstructured for normal, physical communication topologies.

The invention assumes that the infrastructure may be regarded as transmission lines with inserted attenuations, dispersive effects and reflections and with inserted points where it is possible to regenerate the signals I units inserted or coupled at accessible physical points along the transmission line. Using frequency diversity this can be performed for more than one signal direction.

The invention solves in an important way dividing or splitting of the two high frequency wise separated signal directions towards the main terminal node and toward the user terminal nodes or subsequent repeaters in the repeater cascade. The invention solves the problem of combining isolation between ports and signal processing when the signals is split in a Y or star structure. Such splitting of the infrastructure with respect to high frequency signals is either advantageous or mandatory when communication equipment designed for star structures such as with xDSL technologies is utilized. The invention here enables also hybrid uses of technologies such as when using any technology on the main backbone lines in combination with xDSL in junctions points where star structures high frequency wise is realizable. Whether the infrastructure or the system globally speaking has grid or star topology or as is most common, constitutes a mixture the need for splitting will be present. Such splitting may become considerably complex and expensive or may even be too difficult whatsoever to realize as when isolation, signal dynamics and duplex specifications are to be combined. The invention solves this in a novel way with the aid of active circuits and simple solutions. The invention also contributes to regeneration of the signals in both directions in addition to the repeater itself by zeroing each virtual wire pair electrically before the signals travels on. Among the most important properties of the invention is the splitter utilizing the difference between S21 and S12 in that each splitter line in both signal directions has a dedicated gain block. The invention solves the problem with having a duplex filter in each line which may exhibit varying impedance by the active gain being low and thereby enabling high values for IP1 and IP3. In stead common duplex filters are placed in the common lines for the respective signal directions. Additionally the invention offers novel solutions for making the splitter broad banded for both signal directions. The invention can also be used for just one signal direction.

When the infrastructure does not allow physical splitting as with conductors in low voltage power grids as in such cases as in junction boxes, the invention solves the problem using external isolation between the lines outside the splitter aided by clamp on ferrites on each of the respective conductors. In addition the invention utilizes if necessary inserted low impedances between conductors to increase the isolation. The invention makes it possible to introduce this without altering operative conditions of the normal purposes of the infrastructure without requiring power downs during installation and without the need for modification of the infrastructure that could alter it's normal operation.

The invention therefore divides junction points of the infrastructure into one part retaining it's previous application and one part being a signal part with differential signal ports that are split in two signal directions between the signal ports. This is the principle of the invention for any signal processing between on signal port and any other and for any signal direction. In order to break up the original infrastructure high frequency wise known technology is used with insertion of toroids of magnetic or dielectric material.

Since the invention is targeted on infrastructures and mediums with a large degree of reflections and none differential signal modes the invention applies significant suppression of unwanted signal modes. Such a solution in the invention to avoid unwanted signal modes deteriorating connectivity uses three transformers and a common mode choke. Other cases may be satisfied using only two transformers and a common mode choke.

The invention also takes into consideration that the infrastructure may vary in implementation and quality high frequency wise in that introduced signal attenuation cannot be calculated or predicted sufficiently causing beating despite of insertions of ferrites and summation of total attenuation. This may be the case of repeaters transmitting in the same frequency bands and contrary to large physical range may produce beating that will reduce quality or even connectivity. The invention shows a novel method of reducing this problem which can give 10 dB or more improved signal to noise margin by the repeaters transmitting in the same frequency bands being transmitting with carrier frequencies slightly detuned relative to any other of the proximate repeaters that may produce same frequency band beating.

The invention will in some cases utilize very small frequency shifts not larger than to allow the information bandwidth still to remain within that same frequency band. In the invention this will depend somewhat on the modulation used. In the invention such frequency offsets as well as other repeater parameters may be remote controlled either using the main communication system or a dedicated interface. Alternatively the invention may use additionally phase and frequency locking of some or all frequency generators in some or all repeaters to avoid beating. Clock regeneration for this purpose may in the invention be secured by a pilot signal or by regeneration from one of the communication signals.

The comprehensive versatility of the invention is that it allows any modulation type and any communication protocol as well as hybrid solutions using different modulation types and protocols and that existing, commercially available communication equipment can be applied. The invention allows in a novel way the possibility to utilize hybrid technology like for example using the most optimum technology where difficult, long distributions are present and where the most important is to achieve connectivity and stability possibly by sacrificing bandwidth. The principle of the invention to use simplex systems or systems using the same frequency band for different signal directions is normally best served by splitting the signal having separate frequency conversion for the signal directions, possibly using common or external frequency and phase locking for the signal directions that are split or combined.

It may similarly be explained that the principle of the invention for using duplex systems or systems with differing frequency bands for different signal directions usually are most conveniently frequency converted separately, possibly using common or external frequency and phase locking for the signal transmissions that are split or combined.

Some of the principles of the invention for frequency conversion are comprised of a novel way of applying state of the art integrated circuits intended for cable modems.

In this context and in others the invention can make use of repeaters that fully demodulate the signal, possibly using built in clock generator and down to base band where after it is modulated onto a carrier again where one sideband is filter selected or suppressed using IQ modulation. Corresponding actions are taken using modulator respectively demodulator in each end of a communication lap hereby allowing application of standard, commercially available communication nodes.

The invention may incorporate novel solutions using regenerative repeaters, especially super regenerative repeaters.

A regenerative repeater consists of an unstable amplifier or oscillator that is controlled by a quenching circuit. It is commonly know that useful connectivity is difficult to achieve using such repeaters due to the installation variations effecting strongly the repeater's properties, reducing the connectivity substantially. Super regenerative repeaters use quenching frequencies that are above the highest information frequency component and produce sideband combs on both side of the carrier frequency. This may be filtered using band pass filters, however this has drawbacks due to the high requirements of the filtering linearity, stability and repeatable impedances. The invention also offers a novel solution that can apply state of the art integrated circuits and make use of the demodulated signal from a super regenerative repeater which in turn is modulated onto a carrier frequency which is synchronous and in phase with the super regenerative oscillator and the quench oscillator, the latter two having to be mutually synchronized.

The invention makes in the repeaters use of the application of low gain prior to intermediate frequency selectivity and gain by utilizing preferably programmable low and high pass filters at the input as long as unique requirements for cross channel selectivity is not called for. This is made possible by the invention despite that only limited isolation is attainable in the combiners and using pre amplifiers with low gain and large dynamic range and ahead of the signal mixers to compensate for noise figure losses in the frequency mixers. By this method only one, preferably programmable band pass filter for each signal direction is required which the invention introduces succeeding the power gain at a level not more than 10 to 20 dB below the desired output power level from the repeater. Thereby the noise floor reaching the receivers through the combiners can be kept at typically −100 dBm to 120 dBm.

One example of the nearly unlimited scope of applications for the invention in the low voltage power grid are solutions for connectivity and coupler arrangements in mast systems such as for example with EX classification cables. Repeater and splitter and power supply may be placed inside a splash proof, cylindrical encapsulation close to the cable suspension on the mast and close the distribution points when there are also distributions to power consumers. Clamp-on ferrites are placed on individual conductors that are to carry signal differentially. Signal port towards the sub station which is normally used as a terminal point, are coupled into the repeater differentially with two, possibly fire conductors. The invention has corresponding applicability with mast mounted so called naked wire.

Corresponding actions can be carried out within junction panels and junction boxes both indoor and outdoor. The cabinet or box is then usually made of metal and increases immunity against none differential modes. The repeater, including the splitter can be placed in the box with proper environmental protection. Coupling arrangements to the repeater for gains between preceding and subsequent terminal point, possibly junction box is carried out through differential coupling ahead of the ferrites, capacitively or inductively. Similarly the repeater is connected between preceding terminal point and the distribution lines.

In a quite corresponding way the invention can also be applied to improving connectivity on signal cables and wires such as in junction boxes for telephone cables which these days are sued as so called copper access networks for ADSL and other technologies. These are already with respect to signals differential systems and as such are convenient for adaptation. Additionally they carry just low voltages and small currents and the wire sizes are small and allow effective ferrites to be inserted, preferably as clamp-on to ease installation. Short circuits with respect to high frequency is very easy to install. In copper systems the invention may increase the number of useful lines for xDSL from some tens of percent to one hundred percent.

In a relatively corresponding way the invention can provide optimum connectivity during installation in power grids with mast mounted medium voltage lines using so called naked wire. The invention shows a novel way of obtaining signal coupling without the aid of high voltage capacitors that would otherwise represent increased risks of operation disturbances and a substantial cost. The invention utilizes a coupler corresponding to a loop antenna which horizontally or vertically has displaced symmetry to the individual conductors or phases. The coupler can be made more efficient using magnetic materials or using dielectric materials with high Epsilon value. To compensate for the difficulty of introducing short circuits for high frequencies the coupler is realized using two connections thus achieving directional sensitivity. The coupler carries two coupling cables to enable this by utilizing phase difference between the two signal directions. The arrangement for directional discrimination is put inside the repeaters that have a splitter as well. It ensures also that the signals to and from the couplers are treated differentially. Ferrites can be installed with hot system and they increase isolation. A further embodiment of the invention is a stretched out loop working according to the same principle but where the loop geometry also ensures differential input and output feeds without an eventual third center conductor disrupting the symmetry.

Similarly where in ground buried and other cable systems it is difficult to achieve satisfying connectivity like when due to long cable runs between termination points, the invention enables repeaters and possibly also signal splitting at cable splices. Such well insulated cable splices exist in numbers throughout cable systems. Digging down to them is a minor cost relative to digging ditches for new cables or fibre cables. Further, it may be cost effective to dig down to a cable in order to perform a standard cable splicing with the purpose of installing a repeater, possibly also a signal splitter. The coupling loop works together with the existing asymmetry of the splicing being sufficient for the required coupling. The repeater may be dug down and possibly powered inductively using a core and coil or a power cable may be run to the surface. With respect to operational reasons the invention allows signal cables to run to a surface mounted repeater possibly with splitter and junctions.

Embodiments of the invention include versions of the coupling loop advantages for suppressing none differential modes. With the stretched loop part of the loop system works as transmission lines. The tapering conductors are important for the efficiency of the loop system and should not protrude less than 45 degrees from the loop elements themselves, that is the elements running parallel with the cables. The efficiency is at maximum when the spacing between the loop elements is slightly larger than the spacing between the infrastructure outer conductors of such systems as a three conductor, three phase systems.

The invention is characterized by obtaining low noise high frequency gains in a novel way while third order intermodulation intercept points easily reach over +20 dBm while second order products easily is kept lower than −65 dBc. Gains in excess of 10 dB is easily achieved. The invention makes this possible using noise free gain with the transformer 2013 with the aid of voltage up transformation into emitter follower connected transistor 2015, 2016 high input impedance. For even higher power levels and intermodulation properties GaAS or HEMT transistor can be used as source followers.

A characteristic property of the invention is that it is adaptable to any communication system or broadcast system using up to a number of tens of Megahertz analog bandwidth. Examples of such PHY's are Docsis and Wimax. Further characteristics are the facilitation of using fibre for aggregation of services to customer nodes. Still further characteristics of the invention is the facilitation of upstream communication for other types of systems that do not have upstream options. One characteristic is also that the invention can include radio link using analog interfaces for distribution of services. Further characteristics with the invention is the facilitation of sufficient quality for Triple Play and Quadruple Play services all the way to the customer premises. Further characteristics is the facilitation of narrow band services in addition to broad band for alarm, surveillance, emergency communication, remote metering, Smart House applications and the similar.

SHORT DESCRIPTION OF THE FIGURES

FIG. 3 shows how the invention provides high frequency isolation in the infrastructure that the splitter and combiner is connected to.

Figure 7:
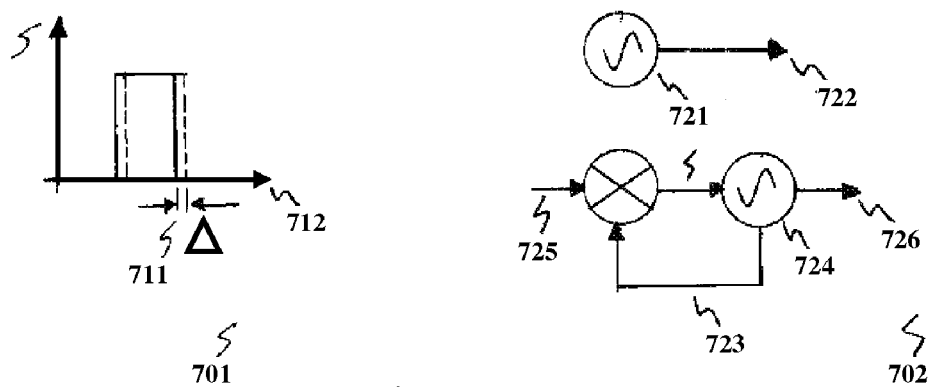

FIG. 7 envisions two methods for reduction of beating, namely using frequency shifting and synchronized oscillators in the signal repeaters.

Figure 8:
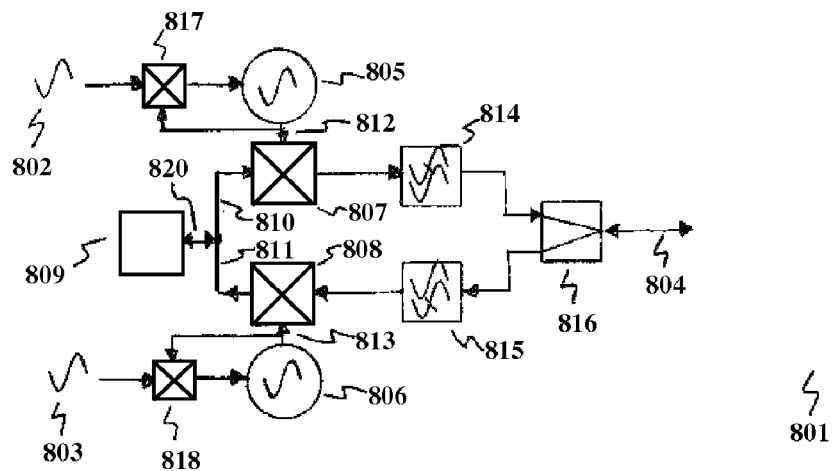

FIG. 8 shows how commercially available communication nodes for simplex can be connected.

Figure 9:
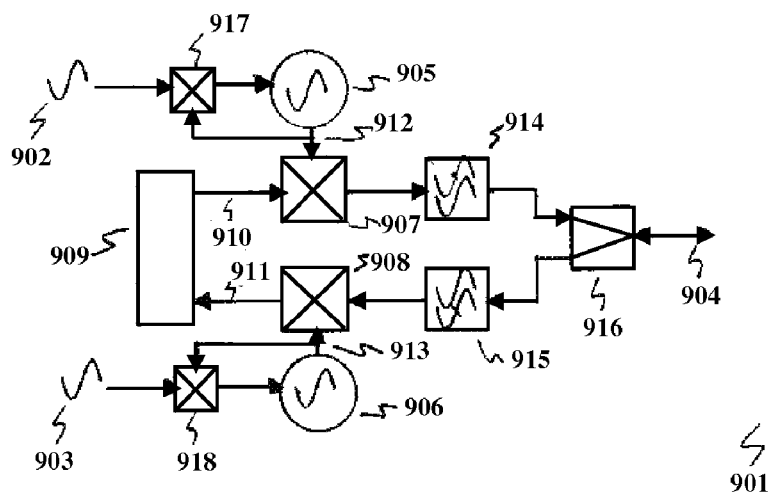

FIG. 9 shows how commercially available communication nodes for duplex can be connected.

Figure 10:
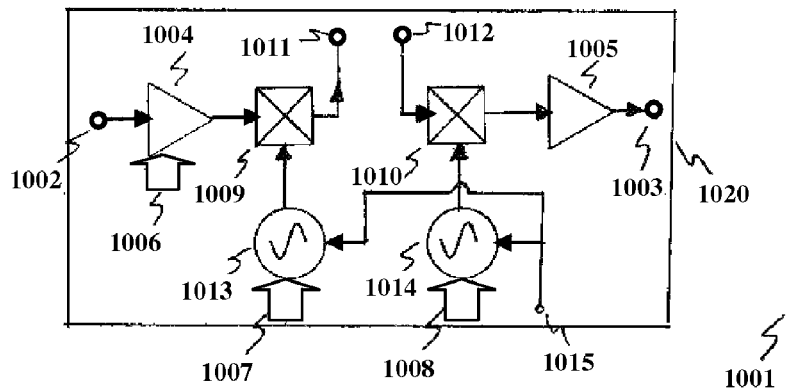

FIG. 10 shows how the invention in a novel way applies state of the art integrated circuits for cable modems.

Figure 11:
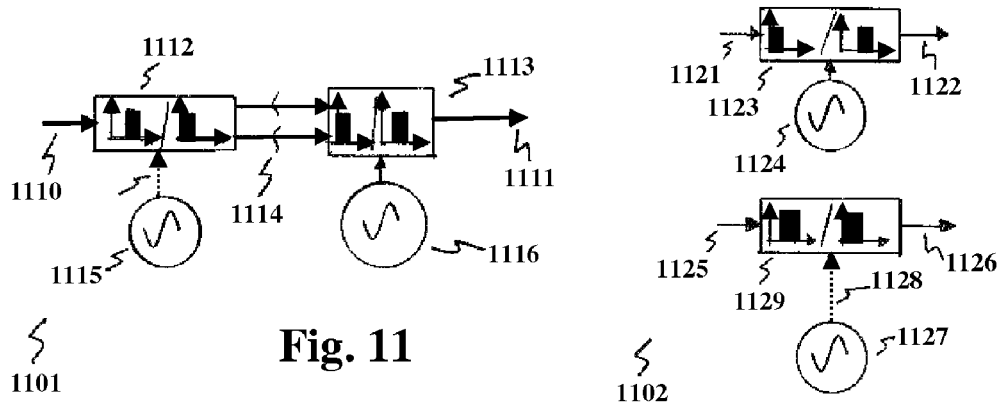

FIG. 11 envisions that full demodulation and re-modulation in signal repeaters can improve connectivity.

Figure 12:
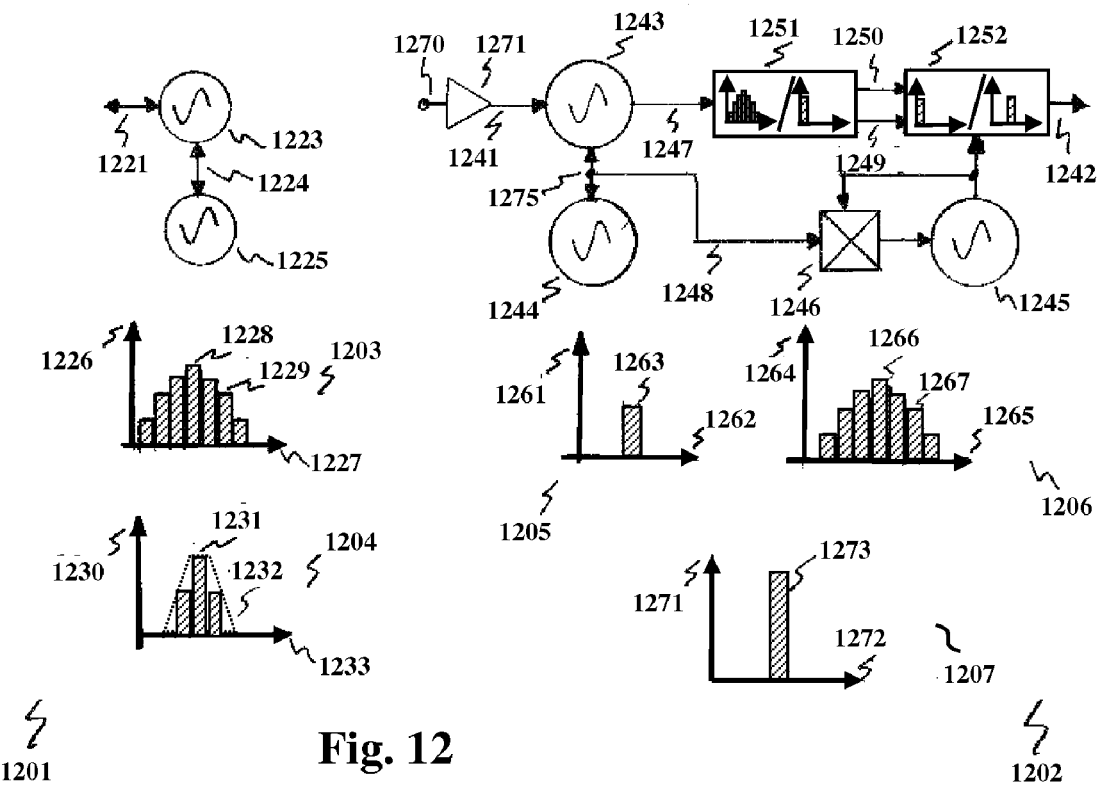

FIG. 12 shows a novel way of realizing as an example one frequency band super regenerative repeaters for low or no port isolation using full demodulation and re-modulation.

Figure 13:
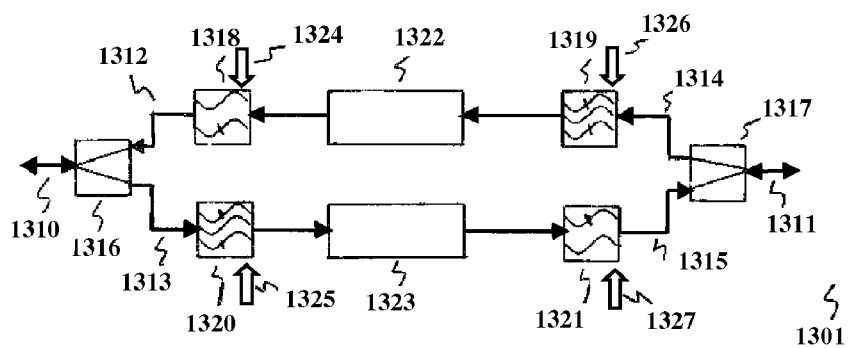

FIG. 13 shows in the invention how duplex properties is controlled following the duplex filter in the transmitting unit.

Figure 14:
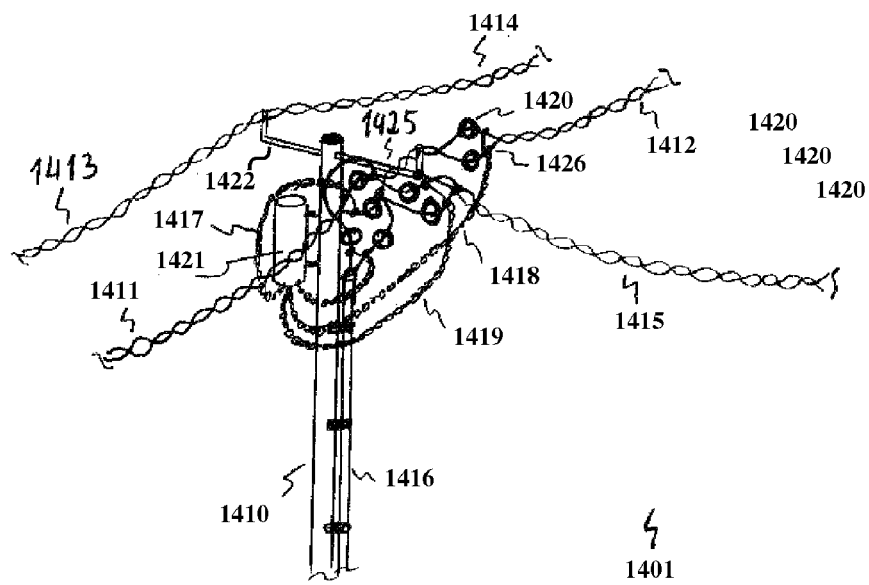

FIG. 14 shows installation details of mast mounted low voltage grids with two to four wire cables.

Figure 15:
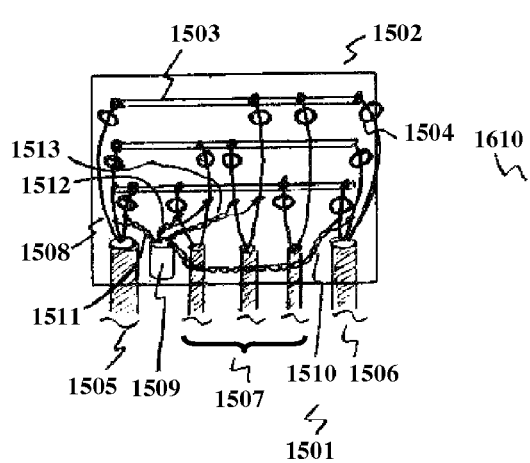

FIG. 15 shows installation details of the invention in low voltage grids with ground buried cables and junction boxes.

Figure 16:
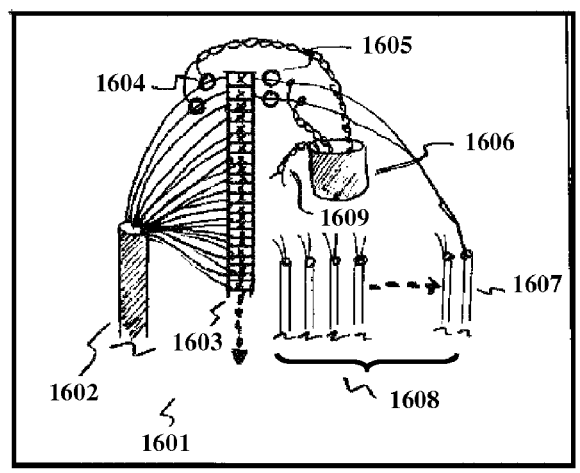

FIG. 16 shows installation details of the invention in telephone networks used as copper access networks using signal cables and junction boxes.

Figure 17:
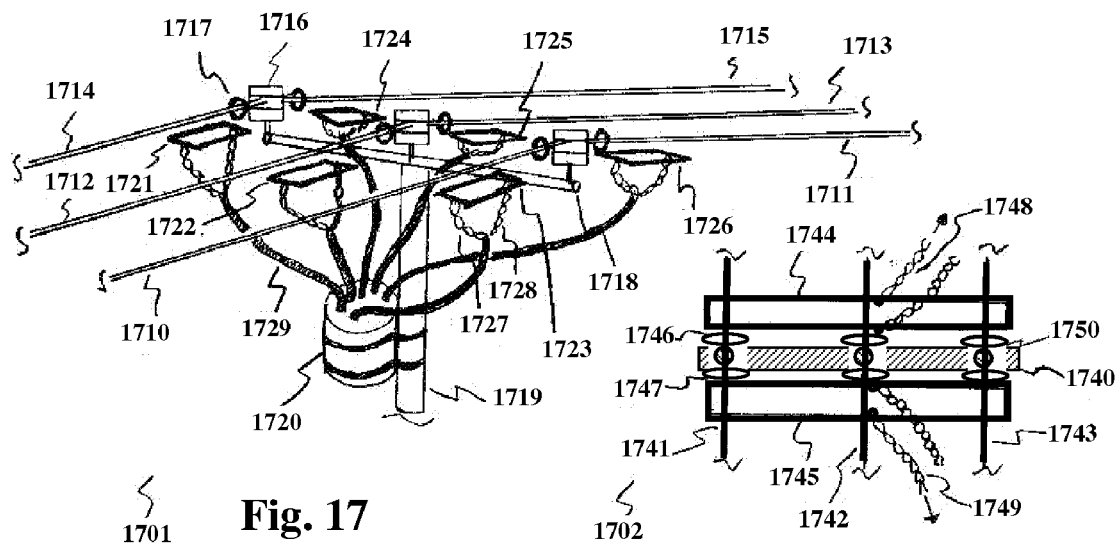

FIG. 17 shows installation details of the invention with mast mounted medium or high voltage systems using naked wire.

Figure 18:
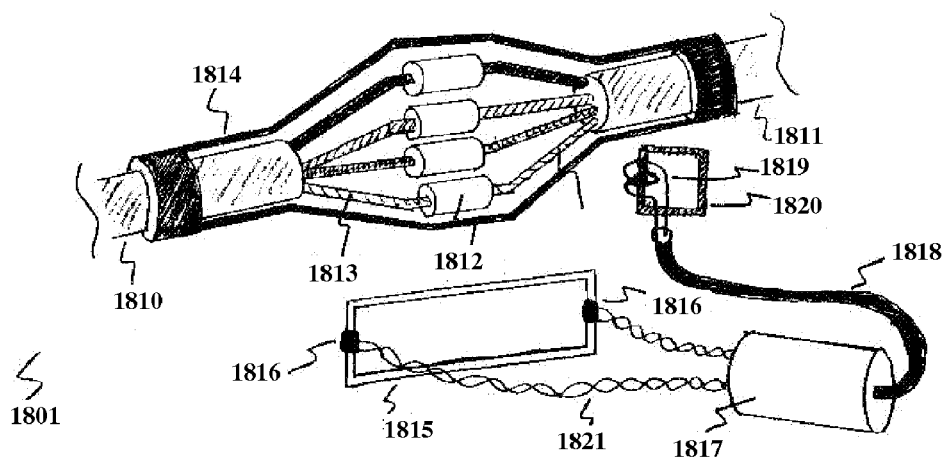

FIG. 18 shows installation details of the invention with installation of repeaters at cable splices in particular with ground buried cables.

Figure 19:
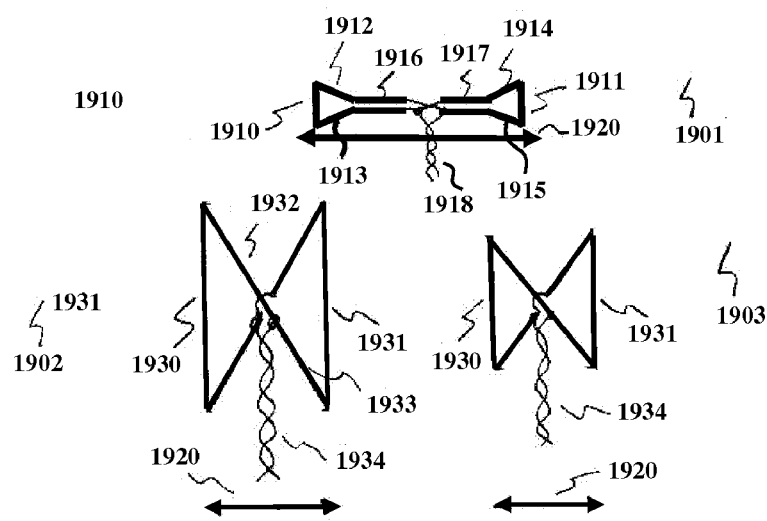

FIG. 19 shows a novel way of the invention of implementing a coupling loop for feeding and tapping of signals.

Figure 20:
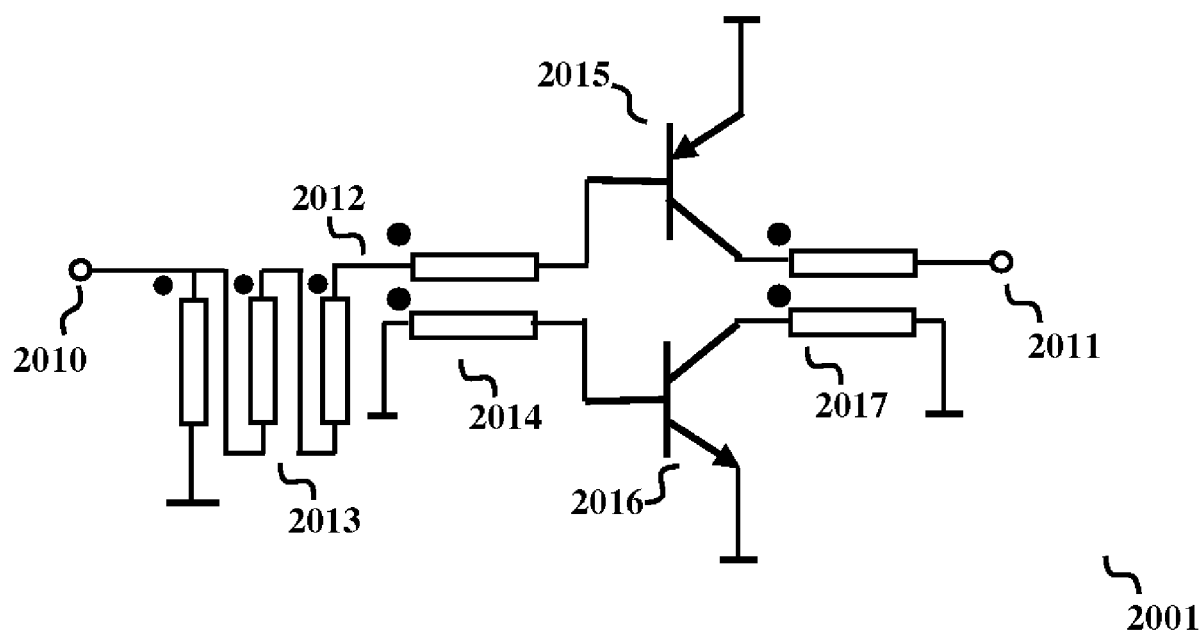

FIG. 20 shows a new way of the invention of attaining gains with very low noise floors and large signal dynamics.

Figure 2:
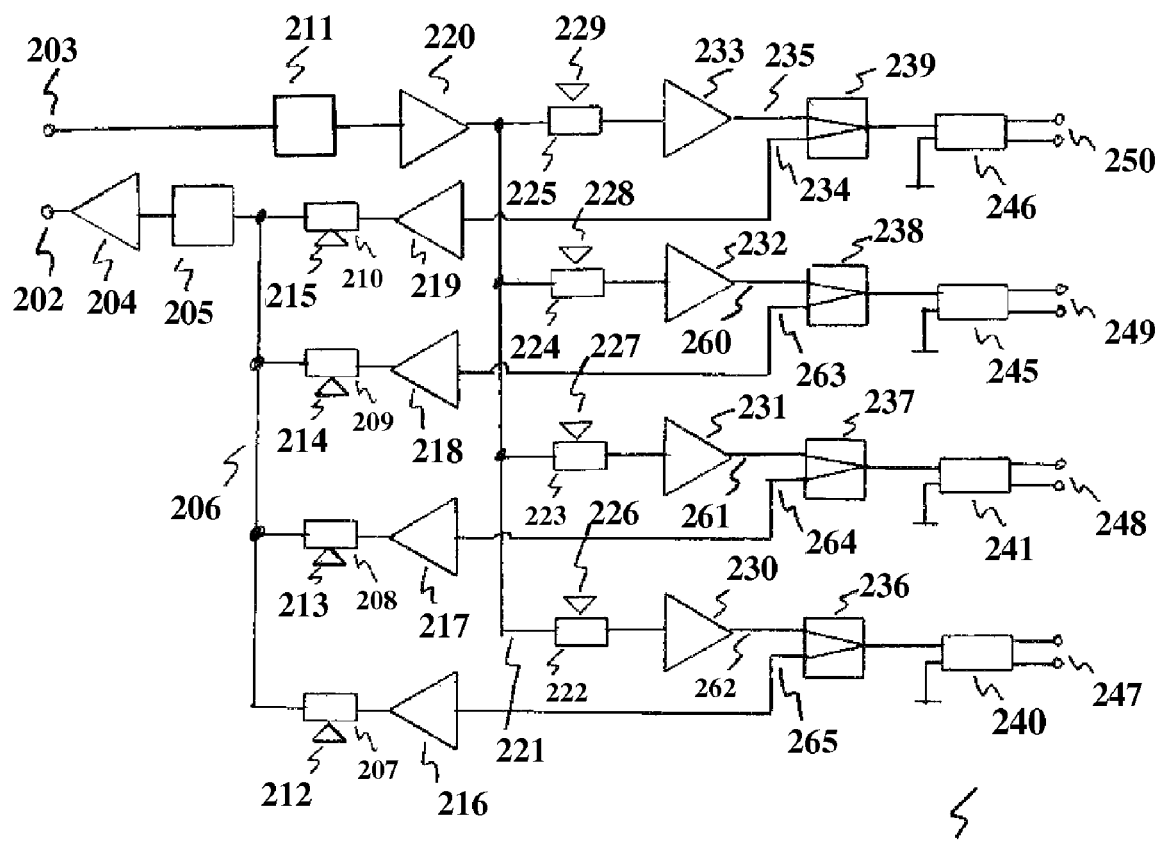
FIG. 2 shows how the invention in a novel way using low cost, repeatable methods ensures splitting and combination of signals together with large signal dynamics, favourable duplex properties and availability for more than one signal direction.
Figure 21:
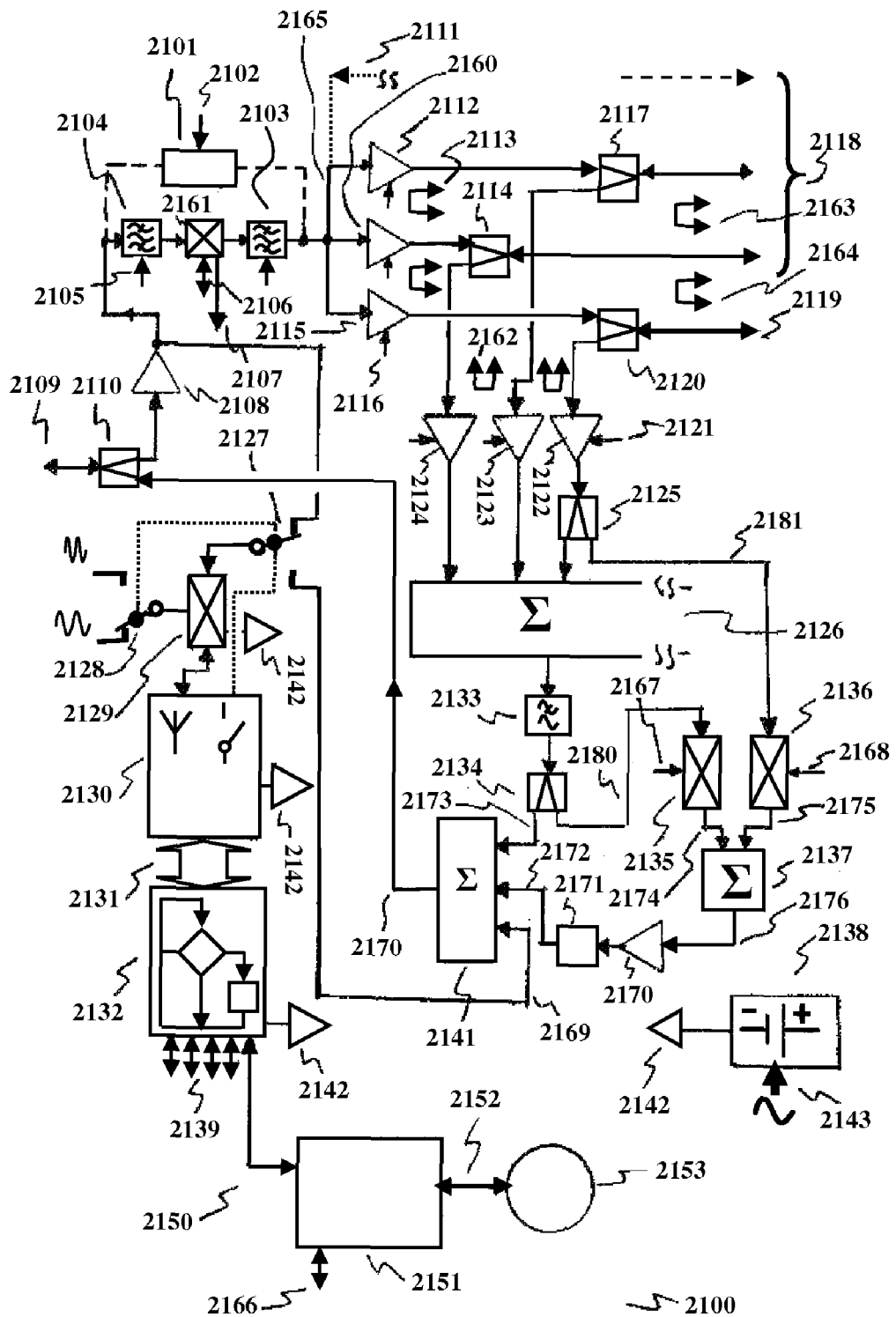

FIG. 21 shows an embodiment of the invention where one embodiment of the signal splitter or as also named; signal divider, signal hub is shown with more details than in FIG. 2.

Figure 22:
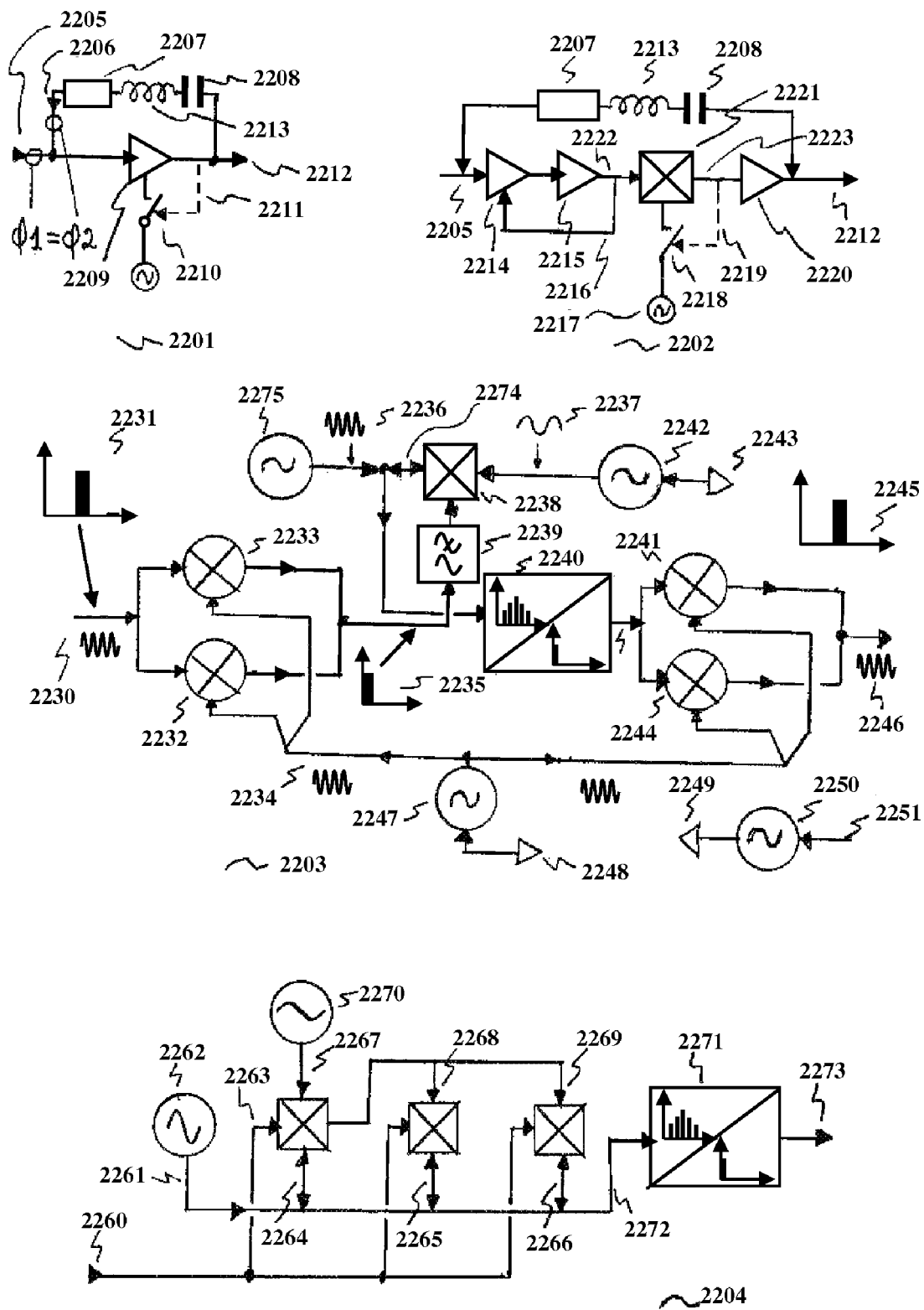

FIG. 22 shows an embodiment of the invention to utilize low port isolation to achieve same frequency amplification for signal repeater in the respective signal direction in connection with signal splitter or other applications.

Figure 23:
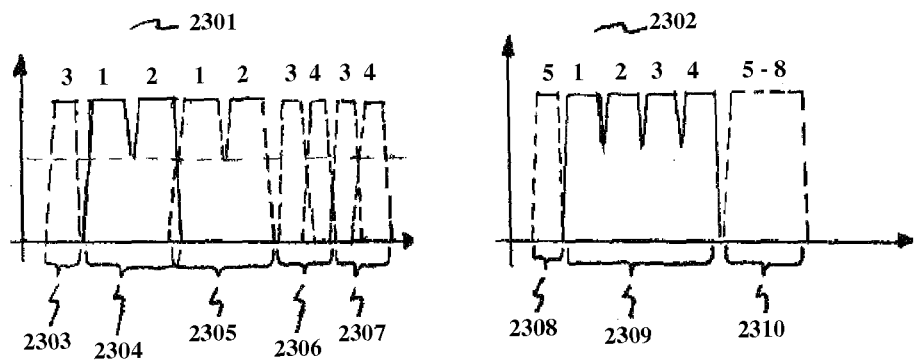
Figure 23:
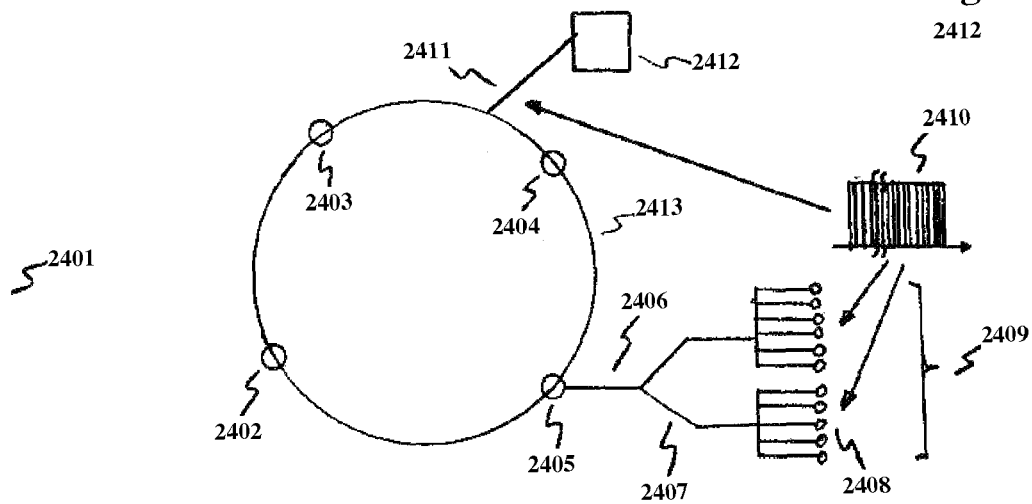

FIG. 23 shows how the invention facilitates a larger and improved utilization of the useful frequency spectrum in power grids.

Figure 24:
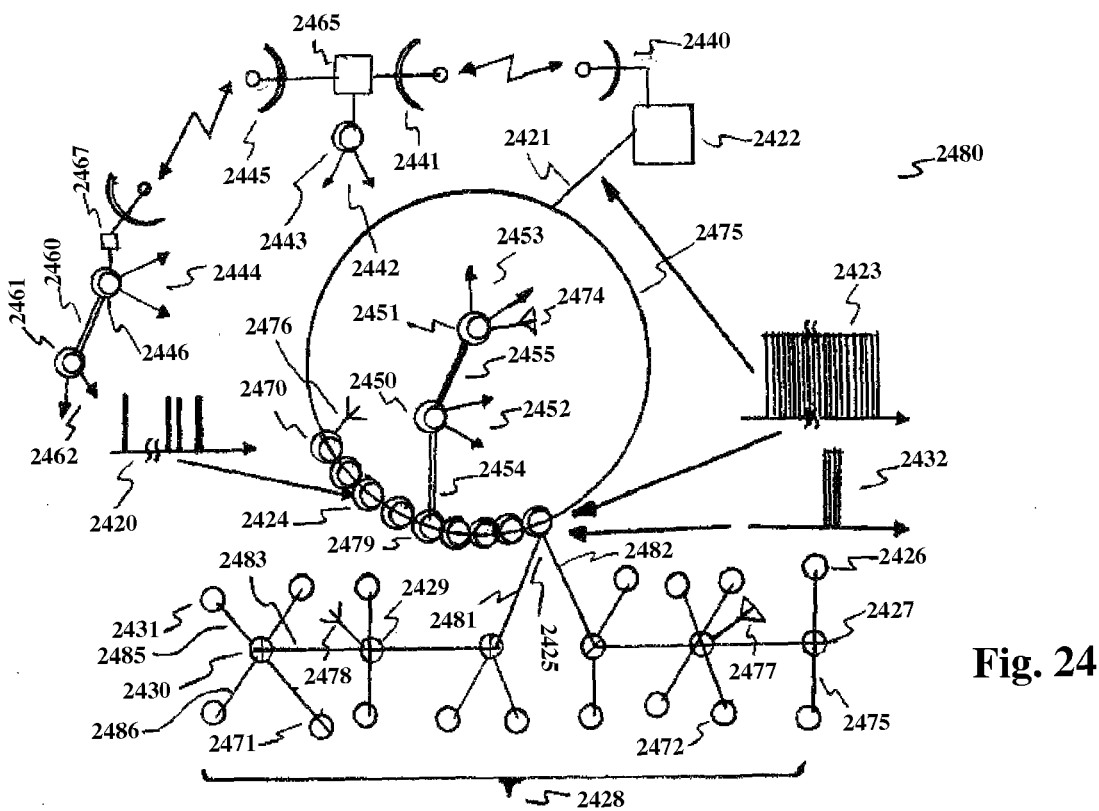

FIG. 24 shows a typical HFC (Hybrid Fibre Cable) system and it shows arrangements by similar applications of distribution of services in the invention which includes fibre ring, medium voltage power systems, radio and low voltage power grids.

Figure 25:
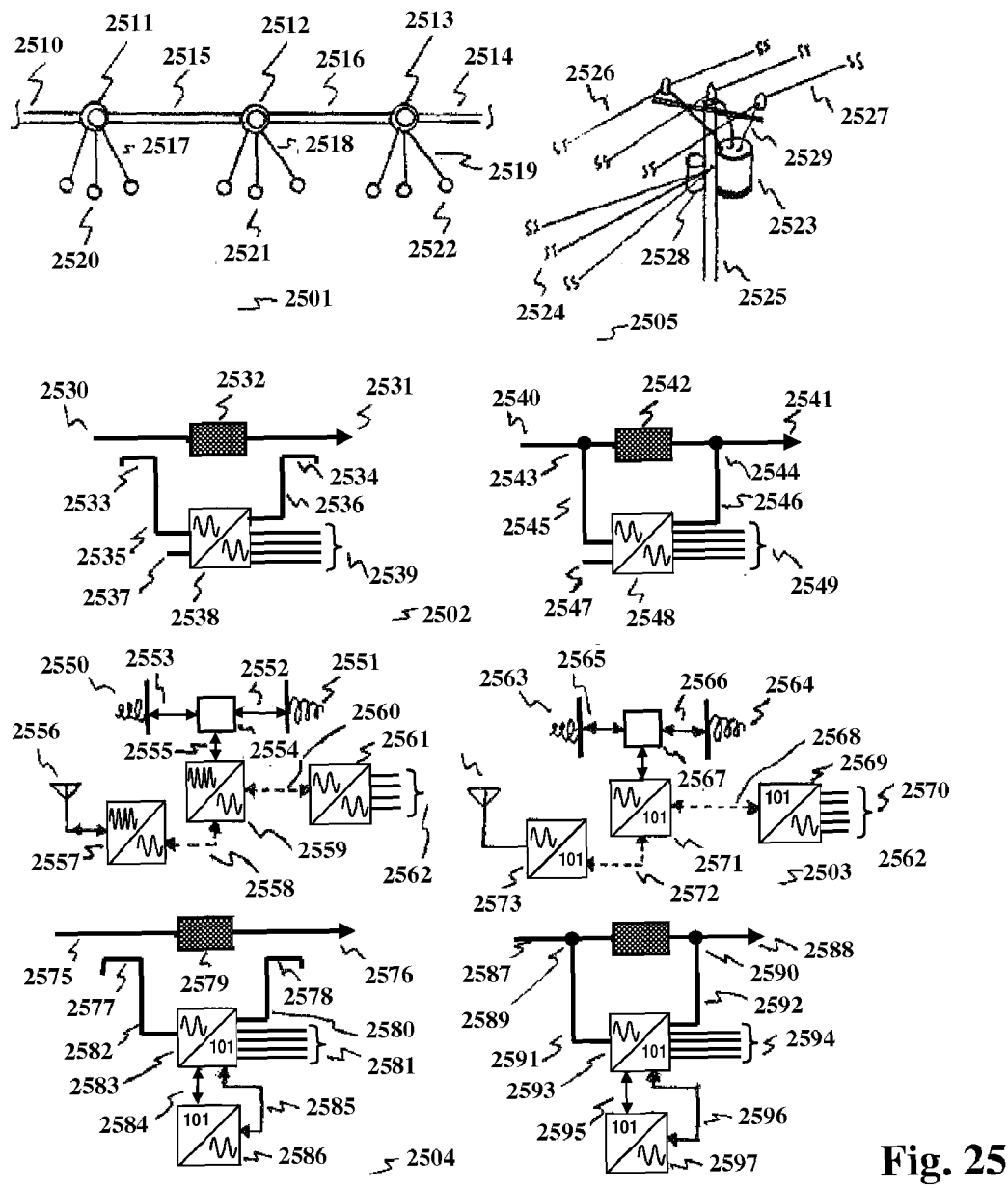

FIG. 25 shows typical line and star architectures with mast mounted transformers or substations I USA and other countries where an embodiment of the invention includes signal splitter and repeater installed at the transformer. The figure shows the invention using an arrangement where signal splitter is installed at medium voltage not using galvanic coupling. Galvanic coupling is shown similarly. The figure shows coupling of signal splitter using microwave repeater at medium voltage lines as signal carriers as well as the option to install simple and inexpensive base stations for wireless networks. The figure shows both use of transparent analog signal processing and media conversion encompassing digital signal processing. The figure shows correspondingly an arrangement in the invention for media conversion and digital signal processing.

Figure 26:
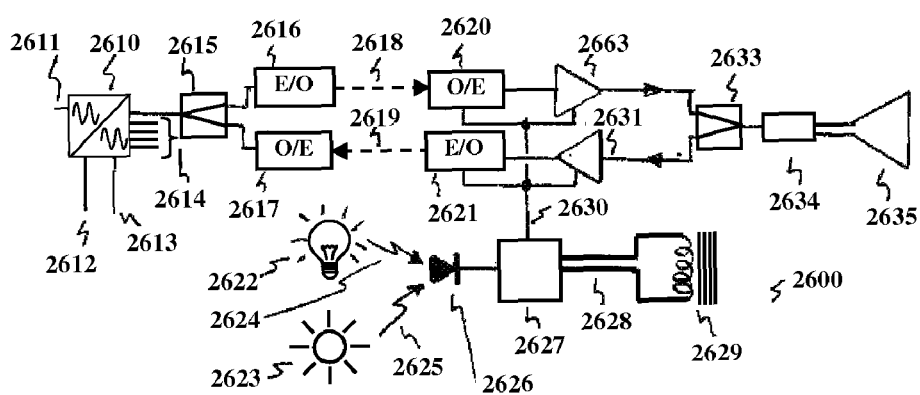

FIG. 26 shows completely none galvanic coupling with signal splitter with medium voltage using analog fibre optic links and differential coupling loop or inductive antenna.

Figure 27:
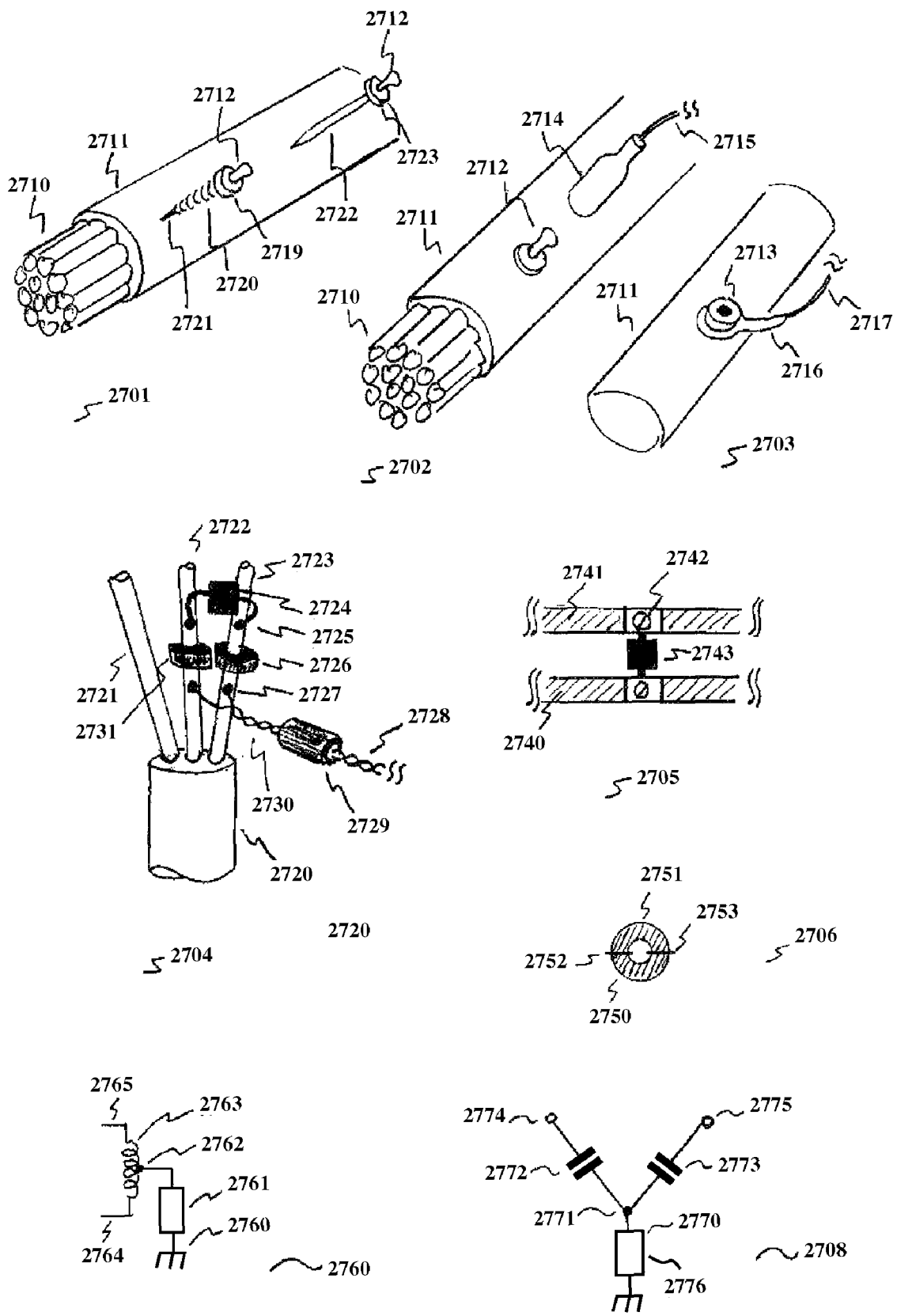

FIG. 27 shows en embodiment of the invention where a none space consuming galvanic coupling to thick cables or cables with coarse wires is implemented using contacts that penetrate the cable. A rivet or nail is shot by an ammunition driven gun into the cable as one embodiment. An alternative embodiment is a self tapping screw with drill tip that can be screwed into the cable time efficiently using a magazine tool, electric or air powered.

Figure 28:
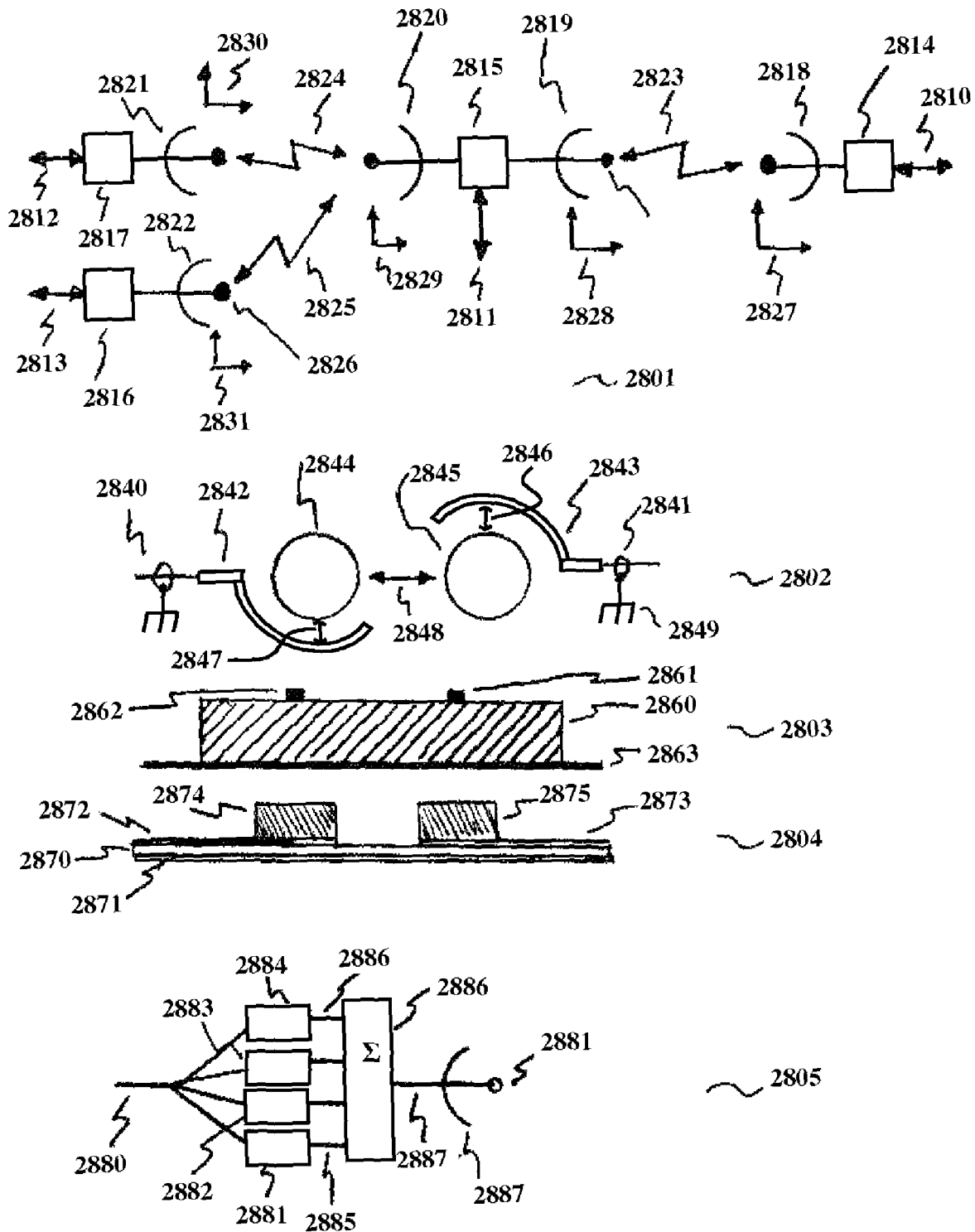

FIG. 28 shows distribution of analog service flows on microwave radio. With this arrangement the invention fills a gap between distribution on fibre and on medium voltage to make services and analog broad band channels such as Docsis channels available at substations.

DETAILED DESCRIPTION

Figure 1:
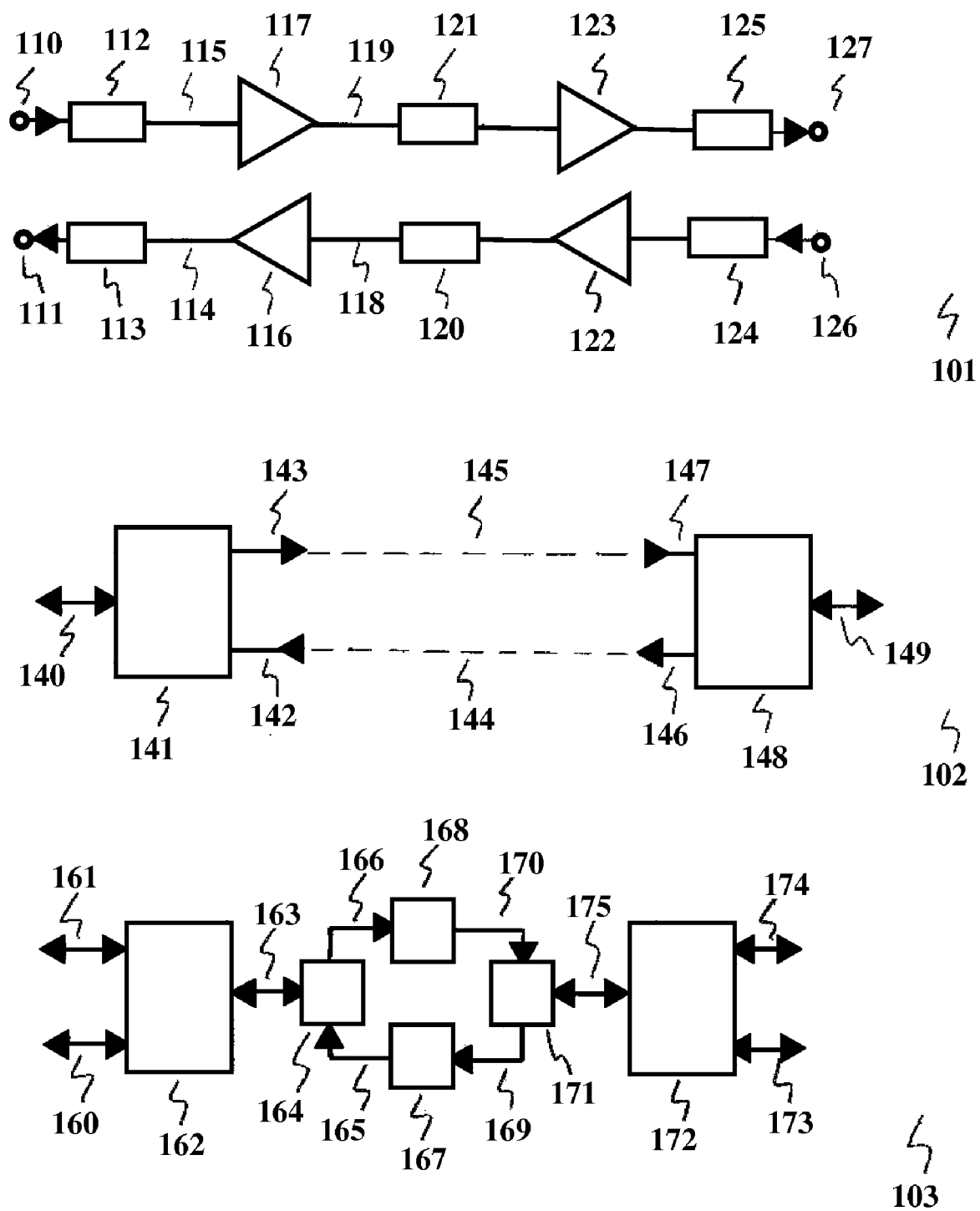
FIG. 1 shows the basic characteristics of signals and connectivity of the invention and it's combinational characteristics for signals.

FIG. 1 shows how the invention assumes that the infrastructure 101 may be regarded as a transmissions line 110, 127 with inserted attenuators 112, 121, 125, dispersive conditions 121, 125 and reflections 121, 125 and with inserted points 117, 123 where it is possible to regenerate the signals in units 117, 123 that are inserted or connected to available physical points, 123 along the transmission line. With frequency diversity this can be done for more than one signal direction 113, 114, 116, 118, 120, 122, 124, for the same line 111, 126.

For communication principles without frequency diversity in the invention, that is simplex systems 102, signals can 140, 149 to and from such communication nodes 141, 148 be split 143, 147, 142, 146 high frequency wise at each end of the communication lap into at least two different frequency regions 145, 144 for both signal directions 145, 144.

Thereby may 103 the signal directions 163, 175 along the way in the system of the invention be split high frequency wise 166, 165, 169, 170 at any point where signal processing is inserted 167, 168 in order to signal process the different directions 166, 170, 165, 169 individually in combination with isolation 162, 172 between the ports of high frequency 161, 160, 173, 174 that is to be established at the termination point.

FIG. 2 shows how the invention solves in an important way dividing or splitting of the two 202, 203 signal directions of high frequency towards the main terminal node and towards the customer premises 247-250 or following repeaters of repeater cascade 247-250 or a combination of these. The invention solves 201 in an important way the problem of combining isolation between ports 202-203, 247-250 and signal processing 205-246 when the signals are to be split in a Y or star structure. Such splitting of the infrastructure with respect to high frequency signals is either an advantage or a condition when communication equipment designated star networks are to be applied as with xDSL technologies. The invention here also facilitates hybridisation of technologies by as and example using any technology on the main backbone network combined with xDSL at the junctions 201 where it is feasible to realize star architecture 247-250 for high frequency signals. The invention therefore facilitates a novel way of connecting as an example cable modem for Docsis back to back via IP interface to a number of xDSL linecards or symmetrical SHDSL modems for hybridisation of as an example cable modem modulation and protocol with xDSL modulation and protocol in that the latter is used on the last lap towards the customer premises. If the infrastructure or system globally speaking has grid or star structure or as most common consists of a mixture the need for splitting 247-250 will still be present. Such splitting can be very complex and expensive or even difficult to realize at all as when isolation, signal dynamics and duplex conditions have to be combined. The invention 201 solves this by simplicity in a novel way using active circuitry 216-220, 204, 220, 230-233 and simple designs. The invention also contributes to regeneration of the signals in both directions in addition to the repeaters themselves by zeroing each virtual line pair electrically prior to the signals travelling on. Among the most important characteristics of the invention is the splitter exploiting the difference of S21 and S12 parameters of the amplifiers or their reverse attenuation in that each splitter line of both signal directions incorporate an individual amplifier 216-220, 230-233. The invention solves problems with using duplex filter in each line of varying impedance by that the active gain is low and thereby enables optimum values for compression point, third order intermodulation and second order distortion. Common duplex filters 205, 211 may in stead be used in the common lines of the respective signal directions. In this way the invention ensures that the signal directions 202, 203 do not generate interference for each other and that the noise floor becomes not to high. Additionally the innovative solutions of the invention make the splitter 235, 260-262 as well as the combiner 234, 263-265 broad banded in both directions. The invention may also be used as splitter or combiner for one signal direction only. Locally or remotely controlled 212-215, 226-229 attenuation 207-210, 222-225 asserts optimum properties of the total system regarding dynamics, immunity and unwanted emissions. In addition the passive, magnetic signal splitters or hybrid couplers 236-239 and the passive, magnetic devices for suppression of none differential modes 240, 241, 245, 246 are important for optimum connectivity and additional properties in both directions.

Figure 3:
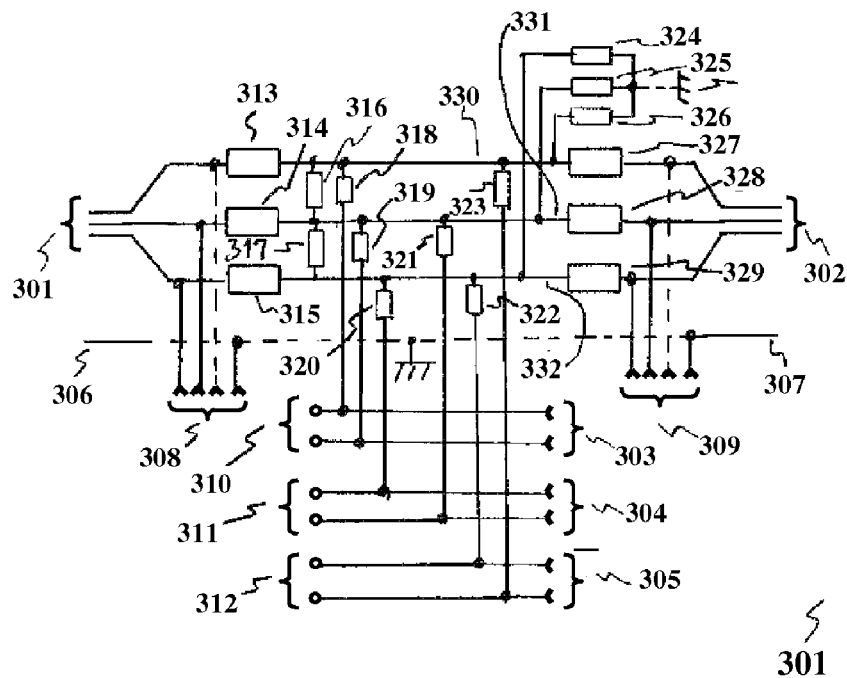

FIG. 3 explains that when the infrastructure does not allow physical splitting is the case with conductors in low voltage grids and as an example in junction boxes the invention solves the problem using 301 external attenuation between lines outside 308, 309, 310-312 the splitter 201 using clamp on ferrites 313-315, 327-329, 314-322 on each of the corresponding conductors. In addition the invention may use if necessary inserted, low impedances 324-326 between conductors or rails 330-332 in order to further increase the isolation between all ports for high frequency signals. The invention makes it possible to introduce this without disturbing the normal operation of the infrastructure, without requiring power downs during installation and without requiring modifications of the infrastructure that could influence it's original purpose like transmission of power, 301, 302, 303, 304, 305. Application of the invention include systems of 2 or more conductors.

Figure 4:
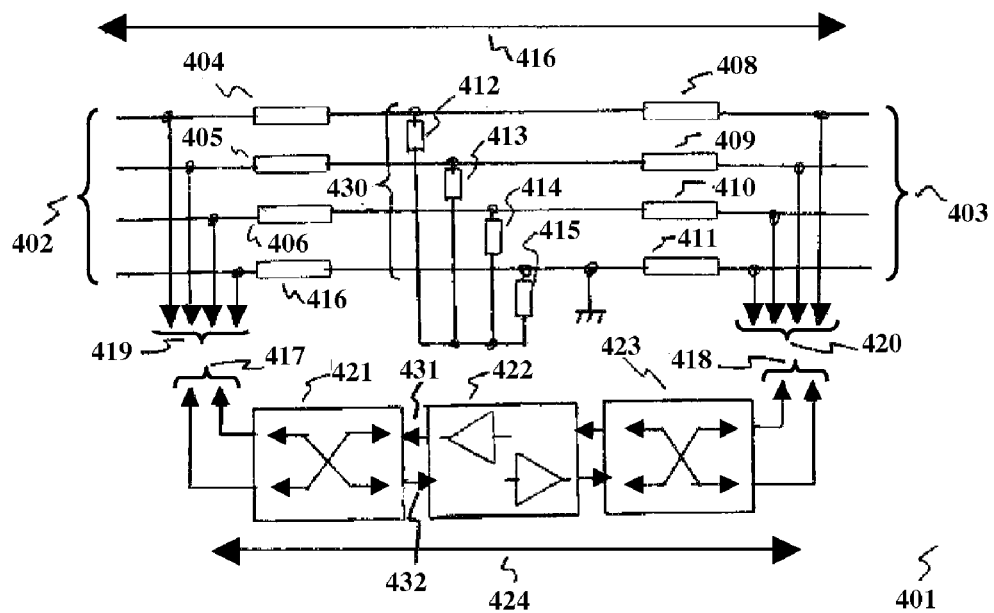
FIG. 4 shows how the invention works with coexistence between the infrastructure original purpose and the high frequency differential signal flow.

FIG. 4 shows that the invention 401 in this way divides junction points 402, 403, 430 of the infrastructure into one part being the original part functioning as normal 402-403 and into one signal part 419-420 with differential signal ports 417, 418 that are split 421, 423 into two signal directions 422 between the signal ports. This is the principle of the invention for any signal processing 424 between a signal port 417 and any other 418 and in any signal direction 431, 432. In order to break up the original infrastructure for high frequency signals known technology is used for insertion of attenuation 424 using toroids 404-411 with magnetic or dielectric material.

Figure 5:
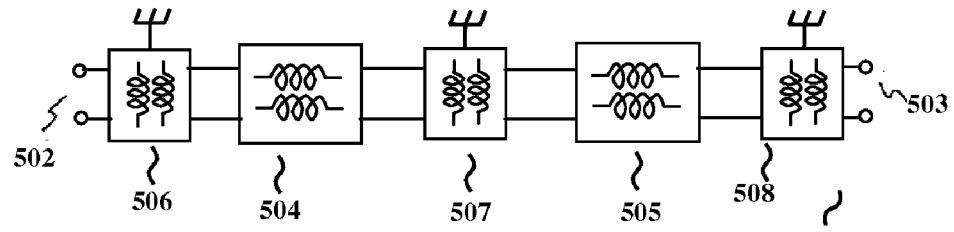
FIG. 5 shows how the invention solves the need for nearly ideal suppression of none differential signal modes in the infrastructure.

FIG. 5 shows that since the invention is intended for infrastructures and mediums with a large degree of reflections and significant, none differential signal modes, the invention utilizes particularly large suppression of unwanted signal modes. One such embodiment 501 of the invention to ensure that unwanted signal modes do not ruin connectivity utilizes three transformers or baluns 506, 507, 508 and two common mode chokes 504, 505. In other cases it may be satisfactory using two transformers and one common mode choke in between them.

Figure 6:
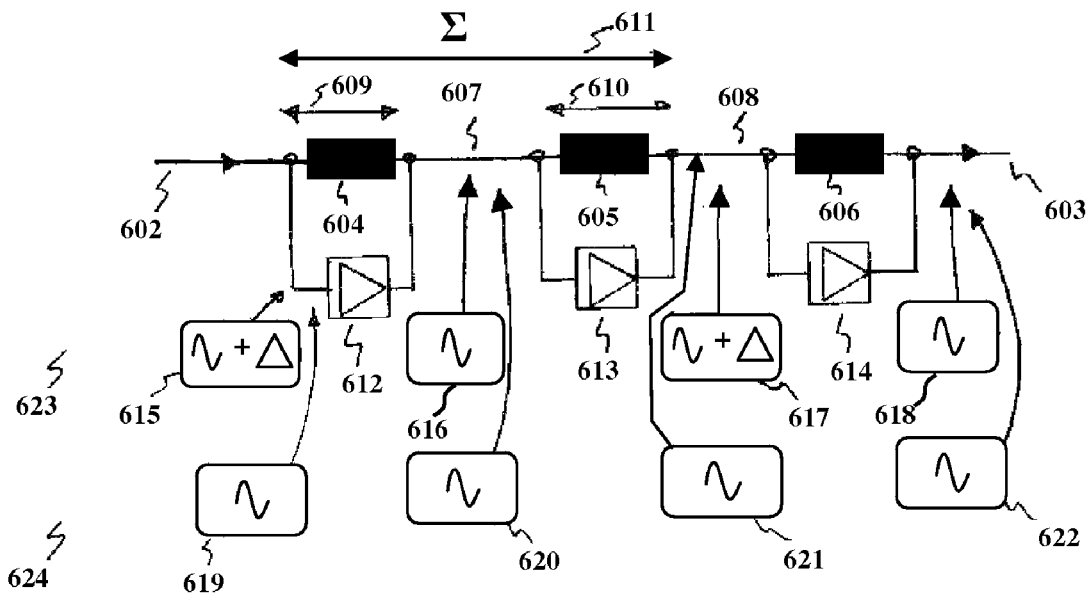
FIG. 6 shows how the invention may solve problems associated with beating in the same frequency band between repeaters with the help of combining range attenuation and frequency shifting.

FIG. 6 shows that the invention 601 also takes into consideration that the infrastructure 602-603 varies with respect to implementation and quality for high frequencies in that introduces signal attenuations 604, 605, 606 cannot be calculated or predicted well enough causing beating to occur despite of for example insertions of ferrites and summation 611 of summed attenuation 609, 607, 610. This may be the case for repeaters 612-614 that transmit in the same frequency band 619-622 and despite large physical range may cause beating that will reduce quality or even connectivity. The invention shows a novel method of reducing this problem that can provide 10 dB or more signal to noise margin by the repeaters 612-614 transmitting in the same frequency band at carrier frequencies slightly offset 615 with respect to any 616, 617, 618 of the nearby repeaters that may cause beating in the same frequency band.

FIG. 7 shows that the invention 701 makes use of very small frequency shifts 711 not larger than to allow the information bandwidth still to remain within same frequency band. In the invention this will to some degree depend on modulation type being used. In the invention such frequency offsets as well as other important repeater parameters is favourably remote controlled using the main communication system or a dedicated interface. Alternatively or additionally the invention uses phase and frequency locking 702 of some or all frequency generators 724 in some or all repeaters to avoid beating. Clock regeneration for this purpose may in the invention be ensured using a dedicated pilot signal 721, 722, 725 or by regeneration of clock 725 from one of the communication signals.

FIG. 8 shows how 801 the invention has wide application by being useful for any modulation type and any communication protocol and hybrid solutions using different modulations types and protocols and by allowing existing, commercially available communication equipment to be used. The principle of the invention for use of simplex systems 809 or systems with same frequency bands 809, 820 for different signal directions 820 is usually most conveniently done by splitting the signals 810-811 having separate frequency conversion 807-808 and signal processing 807, 813, 814, 815 for the signal directions, possibly using common or external frequency and phase locking 802-803, 817-818, 805-806, 812-813 for the signal directions that are combined and split 804, 816.

FIG. 9 explains 901 correspondingly that the principle of the invention for use of duplex systems 909 or systems with differing frequency bands 910, 911 for different signal directions 910, 911 usually are most conveniently done with separate frequency converted 907, 908 and signal processing 907-914, 908-915, possibly using common or external frequency and phase locking 902-903, 917-918, 905-906, 912-913 for the signal directions that are combined and split 916.

FIG. 10 shows 1001 that some of principles of the invention for frequency conversion is done in a novel way using state of the art integrated circuits 1020 with dual super heterodyne frequency conversion 1009, 1010 and built in double frequency synthesizer including VCO 103-104 and designed for cable modems. Since these circuits are designed for QAM and therefore can handle control of internal beating and spurious through flexible frequency programming they exhibit very low phase noise and can invert frequency spectrum and even though they are not designed as such they are well suited for several type repeaters of the invention. They also simplify realization of remote controlled 1007-1008 or automatic controlled frequency and frequency band and gains through the built in communication interface 1007-1008. Regenerative and super regenerative repeaters as described in NO20001057, NO20010132, NO20020112, PCT/NO01/00079, PCT/NO03/00004 are suitable for uses together with these state of the art integrated circuits.

FIG. 11 explains 1101 that in this and other relations the invention can improve connectivity partly using signal processing of large dynamics in base band by applying repeater 1101 that completely demodulates 1112 the signal, possibly aided by built in clock 1115 down to base band 1112, 1114 where after it is modulated 1114, 1113 on a carrier frequency 1116 whereas again one sideband and carrier is filtered out or suppressed using IQ modulation. The corresponding is done using modulator 1123 and respective demodulator 1129 at each end 1122, 1125 of a communication lap and by this standard, commercially available communication nodes can be utilized 1121, 1126.

FIG. 12 shows 1202 that the invention can incorporate new solutions using regenerative repeaters, in particular super regenerative repeaters. A regenerative repeater 1201 consists of an unstable amplifier or oscillator 1223 that is controlled by a quenching circuit 1225 and favourably a directional signal coupling 1221. It is known that good connectivity is difficult to achieve with such repeaters due to the variations in installation conditions affecting strongly the properties of the repeaters and which may reduce connectivity to a large degree. This is among other reasons due to none ideal coupling parameters introducing instability as a consequence of S parameter phase responses becoming none linear. Super regenerative repeaters use quenching frequencies located above the highest information frequency component and produce sidebands 1229 spreading out from the carrier frequency 1228. This may be filtered using band pass filters 1231, but has disadvantages because of strict requirements of filtering linearity and stable and repeatable impedances. The invention can in stead utilize that the super regenerative repeater 1271, 1243, 1244 amplified signal 1247 is demodulated down to base band 1251, 1249, 1250, low pass filtered in a phase linear filter 1251 in order to be modulated 1252 on a carrier 1245 that is synchronous and in phase with the super regenerative oscillator 1243 and quench oscillator 1244 that again must be mutually synchronized 1275. In addition the invention utilizes that prior to the regenerative device one or more gain stages are used 1271 that by the help of S12 parameters provide isolation preventing regenerated signal to leak to the input terminal 1270. The invention thereby prevents that S11 and S22 parameters ruin stability and connectivity, besides this prevents emission and duplex noise from unwanted sidebands 1267 in connections with super regenerative circuits. The invention therefore allows unwanted sidebands and rest carrier to be filtered away. But this is difficult if the new carrier frequency is high. The novel solution of this in the invention is to use dual super heterodyne 1252 where the first or the second intermediate frequency is aligned as to easily obtain filtering of unwanted sideband and rest carrier while the new oscillator for the last frequency conversion also are synchronized accordingly and with the first. The invention facilitates an even better solution in that the super regenerative signal is demodulated and modulated using IQ 1249, 1250 signals. The invention can also combine IQ demodulation and IQ modulation with sideband filtering to achieve remarkably good dynamic properties. In principle the invention can allow a one port repeater but in reality the invention means that attenuation between output signal and input signal may be low, typically down to 10 dB since the output signal with linear transfer characteristics could be coherent with the input signal throughout the whole pass band and thus preventing instability. The result of the invention is a very clean frequency pass band 1273 in the output of the repeater 1207 as well as an improvement of the super regenerative signal dynamics because the whole frequency spectrum 1206 from it is utilized in demodulation and consequently with re-modulating. Further improvements of the system signal dynamics and connectivity in the invention is acquired through the re-modulation improving or facilitating higher output power from the repeater. The invention facilitates using shunted or cascaded regenerative devices 1243, 1244 to increase signal dynamics while also being able to utilize regenerative devices 1243, 1244 integrated with frequency conversion to an intermediate frequency for the regenerative oscillator 1243 especially to attain sufficient quenching frequency for large information bandwidths. Together with the active splitter/combiner 201 the isolation between input and output signal always can be kept at better than 10 dB and provide stability in spite of installation variations being significant.

FIG. 13 shows 1301 that the invention in the repeaters 1301 makes use of the utilization of low gains 1322, 1323 preceding intermediate frequency selectivity 1322, 1323 and gain by preferably using programmable 1324, 1327 low- and high pass filters 1318, 1321 in the input sections when significantly strict requirements of cross channel selectivity is not necessary. This is made possible in the invention despite the limited isolation achieved in the combiners 1316, 1317, with the aid of amplifiers 1322, 1323 with low gain and large signal dynamics ahead of the signal mixers 1322, 1323 to compensate noise figure losses in the frequency mixers 1322, 1323 as well as arranging the local oscillators using programmable frequency synthesizers that can be synchronous with other oscillator functions in the repeater or in the system general with respect to beating and other types of interference. There is therefore need for only one, preferably programmable 1324, 1325 band pass filter 1319, 1320 for each signal direction 1312, 1313, 1314, 1315 and which is incorporated in the invention after the power gain reaching a level 1313, 1314 which is no more than 10-20 dB lower than the desired output power from the repeater. A channel selectivity filter may be included at a fixed intermediate frequency 1322, 1323. Through this the noise floor reaching the receivers 1322, 1323 through the combiners 1316, 1317 be kept at typically −100 dBm to −120 dBm depending on the actual matching to the combiners 1316, 1317. In addition the noise floor is kept correspondingly low for what could leak into any neighbouring repeaters 1301 in other adjacent frequency bands that might be in use in order to utilize the available frequency spectrum for additional channel availability or total system bandwidth. The invention is thereby well suited for connection to the splitter of FIG. 2 that can offer the necessary increase in output power. The invention is most conveniently connected to the splitter without one of the combiners 1316 and directly through separate connections 1312, 1313 for the two signal directions 1314, 1315.

FIG. 14 is one example 1401 of nearly unlimited application of the invention in low voltage grids giving solutions for connectivity and coupling in mast mounted stretches as is the case with conductors designated EX cables 1413, 1411, 1414, 1412, 1415. Repeater and splitter and power supply 1421 may be placed inside a splash proof, cylindrical encapsulation 1421 close to the cable suspension on the mast 1410 and close the distribution points 1425 when there are also distributions 1415 to power consumers. Clamp-on ferrites are placed on individual conductors that are to carry signal differentially.

Signal port towards the sub station which is normally used as a terminal point, are coupled into the repeater differentially with two, possibly fire conductors. The cable continuing to the next mast is connected in the same manner 1418 and the junction distributions are connected correspondingly 1419 including possible cables that may be ground cable versions run downwards on the mast 1416. Connections to the cables may be inductively or using commercially available clamps 1426 that penetrate the insulation. "Short circuit impedance" for high frequency signals can be connected between the conductors 1425 using the same type of clamps. In similar manner a repeater can be connected at any physical point on the cable 1411, 1412, even between masts if it is required. Repeater and splitter/combiner 1421 usually will be powered through signal connections 1417 at one of the cabling connection points.

FIG. 15 shows 1501 that corresponding actions can be carried out within junction panels and junction boxes 1502 both indoor and outdoor. The cabinet or box is then usually made of metal and increases immunity against none differential modes. The repeater 1509, including the splitter can be placed in the box with proper environmental protection. Coupling arrangements to the repeater for gains between preceding and subsequent terminal point, possibly junction box is carried out through differential coupling 1510, 1511 ahead of the ferrites 1504, capacitively or inductively. Similarly the repeater is connected between preceding termination point 1511 and the distribution lines 1512, 1513.

FIG. 16 shows 1601 that in a quite corresponding way the invention can also be applied to improving connectivity on signal cables 1602, 1608 and wires such as in junction boxes 1610 for telephone cables which these days are used as so called copper access networks for ADSL and other technologies. These are already with respect to signals differential systems and as such are convenient for adaptation. Additionally they carry just low voltages and small currents and the wire sizes are small and allow effective ferrites to be inserted, preferably as clamp-on to ease installation. High frequency signal short circuits are very easy to install between the ferrites 1601, 1605 to short circuit the differential conductor pair for signals possibly on the termination strips 1603. In copper systems the invention can increase the efficiency for xDSL from a few tens of percent of the wire pairs to one hundred percent. In this way it can allow transmission of IP TV without the lines mutually disrupting each other's service. The invention improves and facilitates connectivity for xDSL for large bandwidths and higher frequency bands. The invention makes this possible due to several factors one being that the signals in both directions are regenerated by the lines being zeroed for none differential modes before and after they enter a cable with more wire pairs where the cross talk problems are worst.

FIG. 17 shows 1701 that in a relatively corresponding way the invention can provide optimum connectivity during installation in power grids with mast mounted medium voltage lines 1719, 1710, 1712, 1714, 1713, 1715 using so called naked wire. The invention shows a novel way of obtaining signal coupling without the aid of high voltage capacitors that would otherwise represent increased risks of operation disturbances and a substantial cost. The invention utilizes couplers 1721, 1726 corresponding to a loop antenna which horizontally or vertically has displaced symmetry to the individual conductors or phases 1710, 1712, 1714, 1411, 1713, 1715. The coupler can be made more efficient using magnetic materials or using dielectric materials with high Epsilon value. To compensate for the difficulty of introducing short circuits for high frequencies the coupler is realized using two connections 1727, 1728 thus achieving directional sensitivity. The coupler carries two coupling cables 1727, 1728 to enable this by utilizing phase difference between the two signal directions. The arrangement for directional discrimination is put inside the repeaters that have a splitter/combiner 1720 as well and where the physical penetration of lines preferably should take place at the underside of the encapsulation which must have a waterproof top part. The repeater and the splitter 1720 ensures also that the signals to and from the couplers 1721, 1726 are treated differentially with respect to the high voltage line geometry. Toroids 1717, 1746, 1747 can be installed with hot system and they increase isolation. A further embodiment 1702 of the invention is a stretched out loop 1744, 1745 working according to the same principle but where the loop geometry also ensures differential input and output feeds without an eventual third center conductor disrupting the symmetry. The coupler may also be described as a double delta loop.

FIG. 18 shows 1801 similarly where in ground buried 1810 and other cable systems it is difficult to achieve satisfying connectivity like when due to long cable runs between termination points, the invention enables repeaters 1817 and possibly also signal splitting at cable splices 1814, 1812. Such well insulated cable splices 1812 exist in numbers throughout cable systems. Digging down to them is a minor cost relative to digging ditches for new cables or fibre cables. Further, it may be cost effective to dig down to a cable in order to perform a standard cable splicing with the purpose of installing a repeater, possibly also a signal splitter. The coupling loop 1815 works together with the existing asymmetry of the splicing being sufficient for the required coupling without the need for galvanic coupling to conductors 1813 of the cable splice 1814. The repeater may be dug down and possibly powered inductively using a core 1820 and coil 1819 or a power cable may be run to the surface. With respect to operational reasons the invention allows signal cables 1821 to run to a surface mounted repeater 1817 possibly with splitter/combiner 1817 and junctions.

FIG. 19 explains 1901, 1902, 1903 embodiments of the invention include versions of the coupling loop 1910, 1911, 1930, 1931 advantages for suppressing none differential modes. With the stretched loop part of the loop system works as transmission lines 1916, 1917. The tapering conductors' angles 1912, 1915 are important for the efficiency of the loop system and should not protrude less than 45 degrees from the loop elements themselves 1910, 1911 that is the elements running parallel with the cables. The efficiency is at maximum when the spacing 1920 between the loop elements 1910, 1911 is slightly larger than the spacing between the infrastructure outer conductors of such systems as three conductor, three phase systems.

FIG. 20 shows how the invention is characterized by obtaining low noise high frequency gains in a novel way while third order intermodulation intercept points easily reach over +20 dBm while second order products easily is kept lower than −65 dBc. Gains in excess of 10 dB is easily achieved. The invention makes this possible using noise free gain with the transformer 2013 with the aid of voltage up transformation into emitter follower connected transistor 2015, 2016 high input impedance. For even higher power levels and intermodulation properties GaAS or HEMT transistor can be used as source followers.

FIG. 21 shows one embodiment of the invention in which an arrangement of the signal splitter or as also called, the signal splitter or signal divider or signal distributor and signal hub 2100 is shown in more detail than in FIG. 2, 201 which it principally is identical to. In the figure are omitted the external elements that provides external isolation that the signal hub or signal splitter in various embodiments of the invention makes use of 301, 401, 1401, 1501, 1601 in distributions and distribution points like substations, transformer installations, street junctions boxes, junction boxes, mast mounted distributions, in building floor distributions, fuse panels, fuse panel boxes and other. The isolation that the signal splitter gives between distribution lines is in particular an advantage when the isolating lines toward customer nodes is called for due to noise and impedance changes frequency occurring on the opposite side of the customer node. Most embodiments of the invention means generally that transmission of signals in both directions can take place on higher frequencies and farther away from the most problematic noise spectrum on power grids and that downstream signal transfers can take place in a favourable region with respect to short-wave skip frequency regions. Necessary parts of signal hub 2100, 201, 301, 401 in some cases in the invention will be implemented in the customer premises node in order to protect against interference from the customers electrical installations, for connectivity, for analog interfacing of one or several modems and for duplex conditions. In some embodiments of the invention the implementation in the customer premises node should preferably be integrated with one or several customer premises modems CPE. In some embodiments of the invention the implementation of the customer node also will include at leas tone analog and digital node for two way communication for at least one of remote metering, surveillance, alarm and "Smart House" applications. Even if most embodiments of the invention are present as signal hub 2100, 201 301, 401 in substations, junction boxes, outdoor junctions and similar infrastructure belonging to a utility company it is obvious that similar embodiments of the invention are applicable in buildings, enterprise facilities, industry facilities, apartment complexes and in similar implementations. The signal splitter or signal hub will in most embodiments be applicable with PHY in all types of communications systems that utilize up to a few tens of Megahertz analog channel bandwidths and at carrier frequencies up to at least 100 MHz. It is well suited for PHY of Docsis 1.0, 1.1, 2.0, 3.0, of different versions of Wimax technologies and of various types of PLC or BPL technologies. The use of the invention with telecommunication on the power grids accomplishes nearly full bandwidth throughout the whole system as well as achieving nearly one hundred percent stability and predictability all of which has not been achievable so far. This facilitates useful, commercial quality via the power grids of products like Triple Play, Quadruple Play encompassing IPTV, VoD, VoIP and internet and additionally CATV and TV surveillance. In addition the invention facilitates use of DVB on the power-grids similarly to the cable industry. Technologies like EdgeQAM and for example hybrid DVB and IP solutions is also possible with the invention through increased stability and consistency. In other implementations of the invention novel wireless solutions both for two way and broadcast is facilitated. Two way solutions for remote metering, "Smart House" and similar uses can be included quite inexpensively with the invention. In some embodiments of the invention parts of or all circuitry in signal hub can be realized in one chip or in chip sets due to the complexity. The principle of most embodiments of the invention being to achieve increased isolation 2113, 2162 through the various amplifier combinations like downstream 2112, 2160, 2116 correspondingly with upstream 2122-2124 in the shown embodiment is the same as shown in the embodiment shown in FIG. 2. The resulting isolation 2163, 2164 is present at the ports for client lines 2118 and main line 2119 that all are mutually isolated from each other in both signal directions.

Further, the substation 2109 is also mutually isolated with respect to the other ports 2118, 2119. There may be more than one port for main cables if such a junction is present where the signal hub is installed. This may be the case at transformer points in mast mounted grids in USA and other parts of the world. The ports 2109, 2118, 2119 are routed through common mode chokes using galvanic isolation and from there differentially to a new galvanically isolated point which either consists of high voltage capacitors or coupling loop. With low voltage coupling the preferred embodiment would be capacitors in which way the wires from the signal hub is connected galvanically and differentially directly to the power phases. This may also be the preferred embodiment of the invention with medium voltages of 1 to 2 kilovolts. For higher voltages with medium voltage differential, none galvanic coupling using loop would be the preferred embodiment of the invention. With implementation of galvanic coupling to low voltage phases it is easy to realize power supply to the signal hub tapping one of the differential ports in front of the capacitors or similarly between one of the phases and neutral. The number of distributions in the signal hub can with several embodiments of the invention be high and largely only limited by input driver capacity 2165 to downstream power amplifiers 2112, 2160, 2115, 2111 and the summed noise floor in the upstream signal summation part 2126. The isolation between the ports of the signal hub means that the phase distribution to the distribution of the junction is not a problem for differential input and output coupling of signals on the distribution cables. For the distribution lines that are connected to the same phases the number of ports in the signal hub may be easily expanded using resistor networks on each of the ports 2118 provided that the reduced isolation between the respective distribution lines is accepted. Both input and output coupling differentially is decisively important with respect to emission and immunity properties. At the expense of the lower frequency regions capacitive or inductive coupling using for example clamps around the cables or using proximity to the cables can be applied. Levels upstream can be adjusted using programmable 2121 amplifiers 2122-2124 to obtain the best possible dynamic balance for the system that the signal hub 2100 is part of. The repeater 2161 can have AGC (Automatic Gain Control) 2106 or fixed, preset gain. Level balance and output power levels are controlled 2167, 2168, 2116 in the individual modules. Downstream repeater 2161 is either of frequency shifting type or same frequency type and has sufficient dynamics to sustain signal levels in the system that the signal hub is part of. High frequency filters 2105, 2106, 2133 as well as high frequency filters in the modules 2135, 2168 provide selectivity, cross channel suppression and duplex selectivity. A broadband input amplifier 2108 with low gain and large dynamic range ensures unnecessary loss of signal to noise ratio for the downstream signal that can be substantially attenuated. At the same time it provides stable impedance for the repeater and filter 2161, 2104 and for the other modules that are to utilize the downstream signals 2127 and to the downstream splitter 2110 which with varying impedance conditions with power grid cables exhibits limited isolation. In one embodiment the downstream frequency spectrum is aligned in the centre of the frequency window which is feasible with the cables in which optimum immunity conditions exists which again is important for all types of PHY especially due to service flows like unicast and multicast. In some embodiments of the invention selection takes place of the most favourable frequency region for downstream versus immunity both along the cascade and often in particular when close to the customer node where the noise level usually is the highest. In some embodiments of the invention the signal hub allows frequency shifting of downstream to a frequency region which is suitable for the specific part of the cascade or the actual distribution line. This is especially important with Docsis which has no adaptive functions for downstream. The invention enables switch selection of a device 2101 for downstream in addition to the downstream repeater 2161, 2105, 2106. This device 2101 can allow pass through of a different frequency window than the normal downstream repeater 2161, 2105, 2106 for example for narrow band communication such as for so called two way communication, remote metering, alarm and other uses. This signal is then amplified somewhat in the broad banded power amplifiers 2112, 2160, 2115. The splitter hybrid 2110 combines upstream signals or return signals 2170 that are to travel to the substation 2109. Use of splitter hybrid here in place of duplex filter makes the repeater 2161, 2104, 2103 as well as 2135, 2168 more flexible with respect to frequency bands and makes programmability easier. In this embodiment of the invention duplex selectivity is implemented in active modules that must be provided selectivity 2161, 2135, 2168 as well as the application of moderate and broad banded gain in the power amplifiers 2111, 2112, 2160, 2115, 2170 with the exception of some less demanding filtering 2171. The upstream signal 2173 is being directly amplified without frequency shifting from the distribution lines 2118 and main line 2119 and is passed unfiltered or band pass filtered to the summation device 2141 after being split 2133 into an upstream signal to be up converted 2180. Here the invention achieves utilization of the noisy lower frequency region with the aid of high transmit power versus high noise level at the customer node. To the summation device 2137 upstream signals travel 2180, 2175 from the main line 2119 implying the signal hub 2100 further down the cascade that has passed through signal repeater 2168 in a higher frequency band which favourably is above the frequency bands for downstream. In this way the signal hub achieves larger upstream bandwidth capacity which may reach several tens of Megabits/s. Immunity remains very good because the upstream signals along the cascade do not use low frequency where interference levels are the highest. The cascade here is either in the low voltage grid using star architecture or in the medium voltage using star architecture (USA). Repeater 2168 may be of frequency shifting type or same frequency type and programmable for frequency, filters and gains. In the summation device 2137 these signals are summed together with the upstream signal from the local distribution lines 2118 that have been up converted in the repeater 2135 to the same frequency region as that of repeater 2168. The sum signal 2176 goes to a power amplifier 2170 via filter 2171 and the signals 2172 is added in the summation device 2141. In one embodiment of the invention frequencies, high frequency filters and gains are controlled 2139 by a microcontroller 2132. The microcontroller can have other tasks like talking with sensor systems 2151, 2153 such as current and voltage sensing at the location where the signal hub is installed. In one embodiment of the invention the microcontroller is connected to a two way communication module 2130 for external control and downloading of parameters, firmware, two way communication of information from various parts of the signal hub and sensor system 2151, 2153. The communication device 2130 may be constituted of standard radio transceiver. This may be adapted to the signal hub frequency regions with the help of up and down conversions 2129 that possibly may be controlled by the radio TR switch 2127, 2128. One example o fuse of radio and protocol is Zigbee which allows very low stand-by current draws. This allows the radio 2130 to have UPS power supply 2143 which again enhances the applicability of the invention for alarm, surveillance, emergency voice and other purposes. In one embodiment of the invention it may utilize only the part of the signal hub with passive components but with the penalty of seriously degraded properties however being sufficient for application of narrower bandwidths. To the expert further applications than those mentioned in this application text may be obvious and such applications can also encompass wireless applications and applications in other types of cable and wires nets.

FIG. 22 shows arrangements in the invention in order to utilize the limited port isolation with the purpose of achieving same frequency gains for signal repeater for respective signal direction in connection with signal hub and other applications. With known technology 2201 super regenerative gain is applied 2209 both to accomplish stability with same frequency amplification and to achieve the gain itself. The stability is realized by quenching 2210 which in many cases must be synchronous or coherent 2211. In one port super regenerative repeaters the stability is unreliable if impedance changes occur. With two port implementation 2205, 2212 an improvement is achieved determined by the external isolation or attenuation between the ports 2207. Here the repeater in fact offers 2209 both gain and isolation that can be regarded as added to the external isolation 2207. With wide bandwidths and bandwidth factors it is difficult in practice to implement such a solution and it will tend to become complex and costly. This is among other factors due to interference from the sidebands and local oscillator. In one embodiment 2202 of the invention the super regenerative amplifier is used 2221 primarily to render isolation 2207. The amplifier 2221 can possibly have negative gain and sufficient dynamics in the embodiment is alternatively achieved using ordinary amplifiers 2214, 2215 with AGC 2216 or other form of control of dynamics. Output power is accomplished using a power amplifier 2220 and thus providing signal power for the signal hub becomes far easier 2100. An advantage for the signal hub 2100 is also that white noise associated with the super regenerative principle remains at a far lower level and becomes comparable to an amplifier using know technology. In one embodiment of the invention 2203 direct conversion frequency conversion is used 2233, 2232, 2247 for the broad band signal 2231, 2230 down to base band 2235 where it is low pass filtered 2239 and fed to the super regenerative amplifier at a port that provides conversion properties up from the MHz region. The port normally used for high frequency signal injection 2274 is injected with a high frequency signal, preferably in the Gigahertz region and at a suitable level. Quench signal 2237, possibly synchronized 2243, is injected in normal manner. The resulting, modulated signal 2274, is demodulated to base band 2240 and again modulated 2241, 2244 up to the same signal frequency 2246 so that the output signal looks 2245 like the input signal 2231. In one embodiment of the invention a common clock controls 2251 local oscillators 2247, quench signal 2242 and possibly the injection signal 2275. In one embodiment of the invention the clock 2250 is controlled coherently by a signal 2248 that can be a loop circuitry to the repeater input or output signal. In the same way as known technology embodiments of the invention can be implemented as shunted or cascaded arrangements 2204 where the AGC controlled base band input signal 2260 is summed in a number of super regenerative devices 2267-2269, correspondingly also the injected high frequency signal 2262. The modulated high frequency signal 2272 is a sum of the signals 2264-2266 prior to being demodulated to base band 2271 into a signal 2273 that can be up converted to or modulated on a desired frequency. In some embodiments of the invention 2202, 2203, 2204 the circuitry can be realized in a chip or in a chip set.

FIG. 23 shows how the invention facilitates a more comprehensive and improved utilization of the useful frequency spectrum with power grid cables. Examples of use of Docsis 3.0 or more Docsis 1.1-2.0 channels is shown. With frequency shifting repeaters 2301 in the signal hub 2100 the frequency spectrum as shown in the figure is divided into segments for signals from the distribution lines 3, downstream input or output signal 1, 2, downstream output or input signal 1, 2, upstream input signals 3, 4 and upstream output signals 3, 4. The typical downstream bandwidth may be 16 MHz or two EuroDocsis channels. With same frequency repeaters 2302 the division is corresponding but with twice as much bandwidth. Typical downstream bandwidth will be four EuroDocsis channels or 4 bundled channels in Docsis 3.0. The invention also facilitates utilizing full bandwidth with many other telecommunication PHY as for example Wimax. Even PHY of other and less bandwidth demanding technologies can benefit from the invention and among the examples are CMDA, WiFi, GPRS, xDSL, Ethernet.

FIG. 24 shows 2401 a typical HFC (Hybrid Fibre Cable) or fibre-to-the-home system. Transfer takes place of a frequency spectrum of about 800 MHz and typically 100 8 MHz channels 2410 all the way from the central node 2411 and right to the customer 2408 through a small number of nodes 2403-2405 that each has a very large number of customer nodes 2408. The figure shows implementations 2480 of similar applications of distribution of service flows with the present invention that encompasses fibre ring 2475, sub stations or transformers 2461, 2450, 2479, 2443 with signal hubs, medium voltage grids 2454-2455, 2460, radio 2440, 2465, 2467, junction points or junction boxes 2429, 2430, 2427 with signal hubs, low voltage grids 2462, 2428, 2462, 2442 and customer nodes 2471, 2472 with signal adapters and modems. The normal embodiment of the invention will be using analog signal processing due to several factors like cost and life time but the invention also can be implemented using digital signal processing that can include implementations using A/D and D/A converters and FIR filtering and where the implementations preferably have the signal processing realized directly in silicon. In some embodiments of the invention the low power grid 2428 is made up of the power grid within apartment complexes where distribution points 2429, 2430 2427 are distribution panels within building and where signal hub is installed. In some embodiments of the invention the fibre ring will combine analog and digital transmission, preferably using optical frequency multiplexing on the same fibre. In power grid systems the individual node 2425 will carry far less customer nodes 2428 that will be connected in a star architecture out from the sub station node 2424, 2425, but where the medium voltage grid 2454, 2455 most likely has a grid architecture. With most embodiments of the invention the nodes 2424, 2425 therefore will consist of a large number that requires access to the service flows. In may embodiments of the invention using analog distribution of service flows on fibre distribution on the fibre ring in a similar manner as HFC of some hundreds of channels will consisting of Docsis downstreams 2475. The limited bandwidth in the power grid demands that in the nodes 2424 only a few channels can be picked out 2420 selected by frequency conversion and selectivity in the sub station node point 2479. They can be selected from any of all the channels 2423. In one embodiment of the invention all of the selectable channels 2420 can be transferred all the way out to all customers 2428 with the respective sub station node 2425 after being packed together shoulder against should and moved to the frequency region that the signal hub 2100, 201 in the node point uses towards the power grid. In many embodiments of the invention different combinations of channels can be fed to different cable departures from the sub station. This will increase the total bandwidth at the sub station node and increases the achievable number of service flows for one sub station node 2479. Upstream the capacity often will be sufficient for several tens of Megbits/s. Because cable departures with star-star architecture correspond to junction boxes the invention permits such application of signal hub in the sub station as well with resulting isolation between cable departures. Corresponding increase of isolation is achieved also for the upstream signals. In some embodiments of the invention the same is taking place in a reverse order for upstream but here also the upstream frequencies are transferred on original frequencies between signal hub 2100, 201 and the node ring 2475, 2440. In one embodiment of the invention medium voltage 2454 is connected to signal hub in the same way. In other embodiments of the invention the node point 2450, 2451 will be connected to the service flows through one or several other node points 2479 that receive the services through the fibre ring 2480 or radio 2461. One embodiment of the invention uses TV-video channels with DVB quality of for example 1.5 to 2 Mbits/s. One embodiment of the invention uses compression of video services in the main node 2422 such as MPEG4 for delivery of high resolution TV-video channels using for example 1.5-2 Mbits/s. In still one embodiment of the invention compression using for example MPEG4 is used to deliver high resolution TV-video channels with for example 3 to 5 Mbits/s. In this way a typical tripling of the number of feasible video channels is achieved. This means that the invention with this embodiment can offer a virtual availability at the customer 2428 via signal hub at the node point 2425 to select between a number such as 60 TV channels. The invention facilitates this through the use of such as multicast over IP and by benefiting from the statistical probability of simultaneous use being very low thus allowing as an example that 20 to 25 TV channels delivered simultaneously from one single node or from one single sub station is experienced as 100 channels at the customer. In some embodiments of the invention similar channels could be Wimax channels that contain the different service flows. In other embodiments of the invention the headend can be moved out to the node points 2479 and feed or be fed directly by signal hub 2100, 201 at the sub station. These embodiments can be typical o fuse of PHY of PLC or BPL technologies such as DS2. In corresponding ways other embodiments of the invention the headend 2422 can have PHY of Wimax, PLC, BPL, WiFi, DVB or other technologies and correspondingly the customer nodes 2428 can have matching PHY in modems used together with the frequency conversion devices at the customer nodes 2528. For DVB the invention enables the use of set top boxes that includes upstream in the form such as cable modem. In some embodiments the invention facilitates hybrid integrated use of PHY of several technologies through large analog bandwidth and a typical embodiment of the invention is a combination of Docsis and DVB, possibly with the aid of EdgeQAM, MCMTS and similar technologies where EdgeQAM may reside at node points 2479 and receive downstream feeding over Gigabit Ethernet via fibre 2475 or radio and where fibre 2475 can be frequency multiplexed analog and digital. EdgeQAM thereby can be utilized as it is feeding the signal hub and other signal dividers in other nodes 2450, 2451 via medium voltage 2454, 2455. In a hybrid embodiment of the invention and depending on the available infrastructure and positioning of headends or use of technologies such as EdgeQAM, servers for video and VoD can be placed farther out towards the customer nodes like at the sub stations to make access to the number of service flows more convenient from the customer nodes. In one hybrid embodiment of the invention suitable headends, masters or slaves with antennas 2478, 2477 can for wireless technologies such as Wimax or WiFi be placed at selected sub stations 2470, 2476, distribution points, junctions boxes and street junction boxes 2429 with low voltage 2478, 2477 or with medium voltage 2474 and thus create inexpensive cell solutions for these technologies. In one even less expensive embodiment of the invention for this is correspondingly a two way up and down conversion with antenna connection 2478 connected to signal hub at the distribution point 2429 so that PHY of the wireless technology can reside centrally, favourably all the way back to the main node point 2422. In some cases novel micro cell topologies are realizable and in other cases the invention is suitable for macro cells.

FIG. 25 shows 2501 typical line 2510-1514, 2526-2527 and star architecture 2520-2522, 2524 with mast mounted transformers or sub stations 2511-2513, 2523 in the USA and other countries where an embodiment 2505 of the invention including a signal hub and repeater 2528 is installed at the transformer 2523 and where the topology from the node point becomes a star architecture 2520-2522, 2524. In the embodiment of the invention there is a supply line 2583, 2524, 2510 and several load lines 2585, 2486, 2524, 2515, 2520 while one of the load lines 2583, 2527, 2515 or possibly several are also feeder lines or part of the main line and feeder for subsequent junction 2430, 2512. In one embodiment of the invention the medium voltage lines can have fibre along the line and the topology may resemble the one in FIG. 24 with the exception that the low voltage mainly is not star-star. In other embodiments of the invention where fibre is not as available more nodes 2511-2513 will be linked together over medium voltage 2515, 2516 and signal hub will act as repeater also for medium voltage 2511, 2512, 2513 figures also shown in the FIG. 2450, 2451. The figure shows further an embodiment of the invention 2502 with an arrangement where signal hub is installed at medium voltage 2530-2531 with none galvanic coupling 2533-2534 and signal repeater or signal repeaters in signal hub 2538 and coupling to distribution lines 2539 or sub station departure cables 2539. Galvanic coupling is shown in a similar manner 2543-2544. The figure further shows 2503 connection of signal hub 2561, 2569 with use of microwave repeater 2554, 2567 using medium voltage lines as signal carrier as well as added installations of simple and low cost base stations 2557, 2573 for wireless networks. The figure shows both application of transparent analog signal processing 2559, 2557 and media conversion 2572, 2569 encompassing digital signal processing. When the distance on medium voltage lines are too large between the node points 2511, 2512 the microwave signals is maintained using repeaters using known technology 2554, 2550, 2551 also between the nodes. The figure shows 2504 in correspondence to 2502 and 2503 an arrangement in the invention using media conversion and digital signal processing. On embodiment of the invention is using hybrid PHY such as by combination of Docsis on the main lines and xDSL 2586, 2597 in connection with the signal hub 2583, 2593.

FIG. 26 shows an embodiment of the invention 2600 with fully, none galvanic coupling of signal hub 2610 to medium voltage using analog fibre optic links 2618, 2619 and differential coupling loop or inductive antenna 2635. The fibre optic interfaces 2618, 2619 and amplifiers 2631, 2632 receives power none galvanically through photo cells 2626 from artificial light 2622 or in other embodiments of the invention from natural light 2623 and in still other embodiments the power transfer takes place through inductive coupling 2629. The inductive coupler or loop antenna 2635 will in some embodiments of the invention be several smaller loop antennas or loop couplers possibly with magnetic or dielectric material to make the dimensions smaller and installation more applicable. Since the energy requirements are moderate the power supply 2627 can be made as UPS. In one embodiment of the invention this is used in sub stations having hazardous conditions and where human safety must be taken care of. The same may be relevant to mast mounted sub stations.

In FIG. 27 is shown 2701-2703 an embodiment of the invention where a space saving galvanic connection to large diameter conductors or cables 2711 with coarse strands 2710 is performed using contacts 2720, 2722 that penetrates the cable. A rivet or nail 2722 is shot by an ammunition driven gun into the cable as one embodiment. An alternative embodiment is a self tapping screw 2720 with drill tip 2721 that can be screwed into the cable time efficiently using a magazine tool, electric or air powered. Standard screws or nails 2713 can be specially designed with snap on heads 2712 for insertion of insulated plugs 2714 that may be part of a manufactured wire matrix 2715. A more primitive embodiment is use of cable lugs with holes 2716 with wires 2717 that is being fixed by the screws or nails 2713. In one embodiment of the invention there will always run a small current between the cable and screw or nail protecting against corrosion in a similar way as cathodic protection. The current going through the coupling capacitors 2100, 201, 301, 401 is sufficient for the purpose. The figure shows further an embodiment of the invention where differential conductors 2728 are connected to conductors or phases 2722, 2723 of a power cable 2720 differentially and in many embodiments of the invention using screw or nail points 2727 and as close to the point where the conductors split from the cable as possible. In one embodiment of the invention the differential wire injection, extraction, feeding, tapping, power feed through an additional ferrite core 2729 preferably positioned close to the connection points 2727 for improvement of common mode suppression in addition to the coupler arrangement in FIG. 5, 501 and arrangement 2707. The ferrites 2726, 2731 then also can be positioned closer to the cable crotch and the same will be the case of the shunting impedance 2724 which in many embodiments of the invention can be connected through screw or nail principles. The shunt impedance 2724, 412-415, 324-326, 2743 can as supplement or as replacement be connected between the phases 2740, 2741 installed on the phase rails in junction box or as other embodiments between the phase conductors. The shunt impedance may be difficult to install on the rails in many junction boxes with lack of room in which cases installation on the distribution conductors 2722, 2723, 310, 311, 312, 301, 302, 402, 403 is a good embodiment of the invention. In other embodiments and in particular with implementations where installation of shunt impedance is difficult the implicit shunting impedance may be satisfactory. Implicit shunt impedance is made up of attenuation from distributions, about 4 dB per doubling, or it may be made up of transformer or of shunting from rails or combinations thereof. Shunt impedances 2743 may in many embodiments of the invention be arranged using high voltage capacitors soldered to a substrate for mechanical strength and carrying terminals for installation on rails or conductors. In other implementations 2708 shunt impedance will consist of three terminals 2774-2776 where one is connected to ground or neutral for common mode energy to be additionally attenuated in a bleeder resistor 2770 and additionally the shunting of differential modes through the capacitors 2772, 2773. A corresponding embodiment of the invention 2707 where differential couplers or common mode chokes 501 are made using groundings 2760 made via a bleeder resistor 2761 from neutral points 2762 of the coupler magnetic 2763 components. Serial impedances 2726, 2731, 313, 327, 404-407, 408-411 is part of the invention in most of it's embodiments and are in most cases realizable using clamp on ferrites preferably as toroids or split noise suppression ferrites. One embodiment 2706 of the invention is when a small air gap is introduced 2752, 2753 between the core halves 2750, 2751. In the embodiment this gives a small reduction of the magnetic permeability for the high frequency resistance that the toroid introduces in the conductor that it encircles while the reduction of magnetic permeability is large for low frequency like 50 and 60 Hertz. Hereby the invention prevents low frequency modulation due to the introduced serial impedance and offers larger margins when the supply currents are high in the conductors. The invention can correspondingly utilize ferrite materials with low permeability on low frequency and high permeability on high frequency. Further, some embodiments of the invention can utilize toroids or other mechanical form and magnetic impedance made up from metamorphic magnetic materials that have favourable saturation properties. In some embodiments of the invention it is sufficient using implicit serial impedances of the junction. These may for example be made up of conductor impedances, impedances in fuses, impedances in transformers.

FIG. 28 shows distribution of analog service flows with microwave radio 2801. With this arrangement the invention is filling a gap between distribution on fibre and on medium voltage in order to make the services accessible in the sub station nodes. Radio link for digital transmission and interface is known technology. The invention transmits analog signals in both directions but favourably with digital modulation and can be arranged as point to point link 2823, point to multipoint 2824, 2825 and as radio ring with the help of repeaters 2815. With the given implementation the interfaces 2810-2813 are analog and the invention therefore means a substantial cost reduction compared to digital radio links in combination with headend at the node point, as for example with a Docsis CMTS. With the invention no headend is required at the node point. The signals may in stead be up or down converted and amplified in both signal directions toward the power grid and through the signal hub 201, 2100. At the repeater station bleeding of downstream and upstream signals to the repeater is performed and is connected to a node belonging to the local, surrounding power grid through signal hub 201, 2100. In one embodiment the invention uses frequency modulation, phase modulation, PSK or QPSK and thereby making the required repeaters 2815 very cost effective in production. In this embodiment the repeaters have frequency conversion using relatively inexpensive frequency generation as well as limiting amplifiers at intermediate frequencies interconnection between antennas of the repeater 2820, 2815, 2819. In the headend point 2810 the intermediate frequency signals of the transceivers are modulated and demodulated to correspond with the headend used. In the node points 2815, 2817, 2816 modulation and demodulation takes place in order for the PHY to be regenerated. In a further embodiment the invention uses QAM and applies linear signal processing which includes AGC and frequency generation producing low phase noise. This embodiment offers improved utilization of the available frequency spectrum by a factor 3-4. It is fully possible to transfer typically 4 Docsis channels using the invention downstream on a single departure cable of a sub station or transformer. In many embodiments of the invention different channel clusters can be fed into different cable departures 2581, 2582 from substation 2425 or correspondingly on different distribution lines 2581, 2582 when these go directly from the transformer node. This increases the total bandwidth at the sub station node and increases the number of possible service flows at one sub station node 2479. Often the capacity upstream will be sufficient for several tens of Megbits/s. Since departures with star-star architecture correspond to junction boxes the invention facilitates such application of signal hub also at the sub station providing resulting isolation between departure cables. For further capacity the invention is implemented 2805 with several microwave transceivers 2881-2884 where a larger number of channels 2880 are distributed to transceivers and summed 2886 at the antenna feed 2881. In one embodiment of the invention uses a narrow duplex filter 2802, favourably both for receiver and transmitter in order to enable very small duplex spacings. In this way this embodiment of the invention facilitates easier access to licenses since only one frequency band or a narrow frequency region is required for both transmission directions. In one embodiment of the filter production tuning of bandwidth and coupling is performed by adjusting the spacing 2847-2849 between dielectric resonators 2844, 2845 and to simple 50 ohm lines 2842, 2843 that also constitute input and output ports 2840-2841 of the filter. The filter can correspondingly be made using more than two resonators. In one implementation the filter is shielded using a metal encapsulating 2860 against the substrate 2863 where tuning screws or tuning pins 2861-2862 are attached to the screening 2860. In one embodiment the invention utilizes polarization 2827-2831 for the transmission directions 2823-2825 to improve duplex conditions. In still another embodiment the invention uses separate antennas for transmit and receive for duplex operation, preferably by the use of high carrier frequencies and consequently small antennas as for example printed circuit antennas.

The invention claimed is:

1. Signal hub arrangement for transfer and regeneration of high frequency signals in distributed repeater systems, comprising:
the signal hub arrangement being installed in junction points; wherein the arrangement includes the unmodified or modified radio frequency behavior of said junction points; and a RF hub with at least two ports; and wherein said arrangement combines regeneration of RF signals in at least one signal direction; at same frequencies or different frequencies; with distribution of the RF signals between various signal ports; from at least one of feeder lines or load lines; to at least one of feeder lines or load lines; at any of same frequencies and different frequencies; while RF signal isolation for high frequency signals is maintained between input and output signals of at least one signal direction; and between the RF signals at any number of load lines in distribution points; and wherein said arrangement uses the junction points; with conductors that can include at least one of high voltage and medium voltage and low voltage and signal networks.

2. Signal hub arrangement according to claim 1, in that the signal transmission is utilizing differential input and output coupling of signals using at least two conductors of the load lines.

3. Signal hub arrangement according to claim 1, in that the signal transmission is utilizing differential input and output coupling of signals using at least two conductors of the feeder line carrying medium or low voltage.

4. Signal hub arrangement according to claim 1, in that the signal transmission is utilizing at least one microwave input and output interfacing of signals to at least one conductor in mast mounted wires using at least one feeder and load line.

5. Signal hub arrangement according to claim 1, wherein the signal hub by at least one of controlled fashion, intelligent fashion or unintelligent fashion at least one of balances and controls lines that the signal hub is connected to and duplex conditions by signal hub being realized using at least one of semiconductors and microcontrollers and ASICs and communication modules and chips, chip sets and custom chips and custom chip sets.

6. Signal hub arrangement according to claim 1, in that the signal transmission is utilizing at least one microwave input and output interfacing of signals to at least one conductor of mast mounted wires using at least one of feeder lines and load lines.

7. Signal hub arrangement according to claim 1, wherein the said signal hub arrangement working principle to include at least one isolation impedance constituted by at least one of shunt and series impedances consisting of at least one of introduced shunting capacitor and shunting capacitor with resistor and introduced magnetic material and introduced dielectric material and implicit, inherent serial impedance and implicit, inherent shunt impedance.

8. Signal hub arrangement according to claim 1, wherein said signal hub is facilitating utilization of not less than two frequency bands for signal processing of at least one of analog channel and one signal direction.

9. Signal hub arrangement according to claim 1, wherein said signal hub is facilitating application of same fequency.

10. System for transmission of high frequency signals in networks consisting of conductors, wires and cable structures according to claim 1, further comprising the said system utilizing signal hub arrangement for signal transmission of high frequency signals where it achieves isolation of high frequency signals between at least one of feeder lines and load lines in any type of distributions in any type of network using conductors that can include at least one of medium voltage circuits and low voltage circuits and signal circuits and high voltage circuits.

11. System according to claim 10, wherein said system is utilizing at least one of wire circuits and cable circuits to be part of utility company power grid for at least one of medium voltage and low voltage and indoor low voltage.

12. System according to claim 10, wherein said system is facilitating use of at least one of any existing and future types of PHY belonging to at least one of telecommunication technologies and protocols as like at least one of multicast technologies and unicast technologies and broadcast technologies and one way FEC technologies and where examples of PHY is DOCSIS, Wimax, WiFi, CDMA, HFC.

13. System according to claim 10, in that said system is utilizing at least one of up conversion and down conversion and modulation and demodulation for PHY where carrier frequencies must be adapted or introduced.

14. System according to claim 10, wherein said system is utilizing customer node where parts of signal hub arrangement is utilized with respect to at least one of interference suppression and connectivity and analog interface for one or more modems and duplex conditions and interface for narrow band services and node for narrow band services as with remote metering.

15. System according to claim 10, wherein said system is utilizing at least one downstream channel using at least on of but not limited to DOCSIS channel and WiMax channel and DVB channel.

16. System according to claim 10, wherein said system is utilizing at least one upstream channel using at lease but not limited to DOCSIS return channel and WiMax return channel and DVB return channel.

17. System according to claim 10, wherein said system is utilizing up conversion of upstream channel when this is necessary in order for the upstream channel to arrive at the sub station node to ensure reception of upstream channel in a low noise frequency region.

18. System according to claim 10, wherein said system is utilizing upstream channel in a lower frequency region to utilize said frequency region out from the customer node where high transmit power from the said customer node secures signal to noise ratio despite high noise level at the said customer node and through the possibility of again converting down the said upstream channel at the sub station node.

19. System according to claim 10, in that said system is utilizing signal pass through for some upstream channels in vacant, lower frequency region through the junction points and all the way to the sub station or to the last distribution node said with said signal hub arrangement adjacent to the sub station for redundancy or increased number of upstream channels.

20. System according to claim 10, wherein said system is to utilize at least one of none galvanic coupling to at least one of medium voltage and low voltage.

21. System according to claim 10, wherein said system is utilizing at least one of galvanic coupling and none galvanic coupling to at least one of medium voltage and high voltage and low voltage.

22. System according to claim 10, wherein said system is utilizing at least one of galvanic coupling to at least one of medium voltage and low voltage.

23. System according to claim 10, wherein said system is utilizing at least one signal hub arrangement with analog to analog interface.

24. System according to claim 10, wherein said system is utilizing at least one signal hub arrangement with analog to digital to digital to analog interface.

25. System according to claim 10, wherein said system is utilizing at least one signal hub arrangement connected to interface at least one wireless system for local coverage using said wireless system.

26. System according to claim 10, wherein said system is utilizing at least one signal hub arrangement with at least one of intelligent or remote control of signal hub arrangement parameters and variables.

27. System according to claim 10, wherein said system is utilizing at least one signal hub arrangement with redundant communication capacity for narrow band applications that at is powered by at least one of electrical grid and by UPS uninterrupted power supply.

28. System according to claim 10, wherein said system is utilizing at least one signal hub arrangement connected to at least one of at least one sensor and at least one actuator.

29. System according to claim 10, wherein said system through said signal hub arrangement is capable of connecting to any type of service interface that uses digital or analog bandwidth.

30. System according to claim 10, wherein said system is utilizing none galvanic and touch proof coupling to medium voltage or high voltage using optical solutions.

31. System according to claim 10, wherein said system is utilizing at least one signal hub arrangement in node point that is connected to radio link using analog interface.

32. System according to claim 10, wherein system is utilizing at least two signal hubs in at least two node points being interconnected through medium voltage for transmissions of at least one downstream channel and at least on upstream channel across said medium voltage connection for distribution of at least one of analog channel capacity and service flows.

33. System according to claim 10, wherein said system is utilizing at least one signal hub arrangement with galvanic coupling to cables using penetrating screws or nails that can be connected for differential feeding and tapping or to shunt impedances.

34. System according to claim 10, wherein said system is utilizing signal hub arrangement with repeater with none galvanic coupling to ground buried cables with unshielded splices or splices with leaking shield and especially with long medium voltage cables.

35. Repeater for same frequency gain for signal transmission of high frequency signals according to claim 1, further comprising said repeater to achieve stable isolation for high frequency signals between at least one of feeder and load lines of any type of distribution in any type of circuit using conductors that can include at least one of medium voltage circuits and low voltage power grids and signal networks and high voltage circuits.

36. Repeater according to claim 35, wherein said repeater utilizing down converting demodulation of signal frequency to base band and regulated gain in base band in amplifiers and base band signal injection and signal injection with high frequency to super regenerative amplifier using quenching and signal extraction from modulated high frequency that is demodulated to base band and up converted modulated to signal frequency.

37. Repeater according to claim 35, in that said repeater dynamics is becoming improved using interconnection of a number of said regenerative devices.

38. Signal repeater according to claim 35, wherein said signal repeater completely or partly is being realized as a chip or as chip set.

39. Radio link for signal transmission of high frequency signals according to claim 1, further comprising said radio link node interfaces being analog high frequency signals directly connected to signal hub arrangement and achieving isolation between at least one of feeder and load lines in any type of distribution in an type of circuit using conductors that can include at least one of medium voltage circuits and low voltage power grid and signal networks and high voltage circuits.

40. Radio link according to claims 39, wherein said radio link is including at least one of repeaters and point to point and point to multipoint.

41. Radio link according to claim 39, wherein said radio link with respect to small duplex spacing includes at least one band pass filter using dielectric resonators on microwave for at least one of transmitter and receiver and differing antenna polarization for different antennas and separate antennas for transmitter and receiver.

42. Radio link according to claim 39, wherein said radio link is utilizing more than one microwave transceiver in summation configuration for linear increase of bandwidth for at least one of downstream and upstream said microwave link.

43. Triple Play and Quadruple Play signal transmission with high frequency signals according to claim 1, further comprising said transmissions being delivered to customer nodes via sub stations using signal hub arrangement where said hub can achieve isolation for high frequency signals between at least one of feeder and load lines in any type distribution in any type of circuit using conductors that can include at least one of medium voltage circuits and low voltage power grids and signal circuits.

* * * * *